US012547369B2

(12) United States Patent
Torgerson et al.

(10) Patent No.: US 12,547,369 B2
(45) Date of Patent: Feb. 10, 2026

(54) PLAYING MEDIA CONTENT IN RESPONSE TO DETECTING ITEMS HAVING CORRESPONDING MEDIA CONTENT ASSOCIATED THEREWITH

(71) Applicant: Sonos, Inc., Santa Barbara, CA (US)

(72) Inventors: Jeffrey Torgerson, Santa Barbara, CA (US); Paul Bates, Santa Barbara, CA (US); Matt Welch, Cambridge, MA (US); Sanford Spivey, Santa Barbara, CA (US); Ryan Taylor, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 374 days.

(21) Appl. No.: 18/343,865

(22) Filed: Jun. 29, 2023

(65) Prior Publication Data

US 2024/0036810 A1 Feb. 1, 2024

Related U.S. Application Data

(63) Continuation of application No. 16/746,912, filed on Jan. 19, 2020, now Pat. No. 11,740,854.

(60) Provisional application No. 62/794,654, filed on Jan. 20, 2019.

(51) Int. Cl.
*G06F 3/16* (2006.01)
*H04N 21/43* (2011.01)
*H04N 21/436* (2011.01)

(52) U.S. Cl.
CPC ....... *G06F 3/165* (2013.01); *H04N 21/43074* (2020.08); *H04N 21/43615* (2013.01)

(58) Field of Classification Search
CPC .............. G06F 3/165; H04N 21/43074; H04N 21/43615; H04N 21/4302; H04N 21/4524; H04N 21/458; H04N 21/4668; H04N 21/8113; H04N 21/42202
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Kyu Chae
(74) *Attorney, Agent, or Firm* — Akerman LLP

(57) ABSTRACT

Embodiments disclosed herein include one or more playback devices, server systems, and/or computing devices, individually or in combination determining that an item is present within an area comprising a playback device, wherein the item has corresponding media content associated therewith, and in response to determining that the item is present within the area comprising the playback device, causing the playback device to play the media content corresponding to the item, wherein the media content comprises one or both of audio content or video content.

20 Claims, 19 Drawing Sheets

(56) References Cited

U.S. PATENT DOCUMENTS

| | | | |
|---|---|---|---|
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,466,794 | B2 * | 11/2019 | Maeda ............... G06F 3/017 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0318037 | A1 | 11/2013 | Shan et al. |
| 2015/0256926 | A1 | 9/2015 | Kim et al. |
| 2016/0007079 | A1 | 1/2016 | Vega-Zayas et al. |
| 2016/0299669 | A1 | 10/2016 | Bates |
| 2017/0011624 | A1 | 1/2017 | Guihot |
| 2017/0171699 | A1 | 6/2017 | Jin et al. |
| 2017/0208363 | A1 | 7/2017 | Glazier et al. |
| 2017/0242653 | A1 | 8/2017 | Lang et al. |
| 2018/0041559 | A1 | 2/2018 | Chen |
| 2019/0327514 | A1 | 10/2019 | Kuplevakhsky |
| 2019/0335249 | A1 | 10/2019 | Shimy et al. |
| 2021/0026518 | A1 | 1/2021 | Lewis et al. |
| 2021/0342590 | A1 * | 11/2021 | Choi ............... G06T 11/60 |
| 2025/0069341 | A1 * | 2/2025 | Nepveu ............ H04N 13/117 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action mailed on Mar. 10, 2022, issued in connection with U.S. Appl. No. 16/746,912, filed Jan. 19, 2020, 28 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Sep. 1, 2022, issued in connection with U.S. Appl. No. 16/746,912, filed Jan. 19, 2020, 32 pages.
Non-Final Office Action mailed on Jun. 24, 2021, issued in connection with U.S. Appl. No. 16/746,912, filed Jan. 19, 2020, 27 pages.
Notice of Allowance mailed on Mar. 29, 2023, issued in connection with U.S. Appl. No. 16/746,912, filed Jan. 19, 2020, 7 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

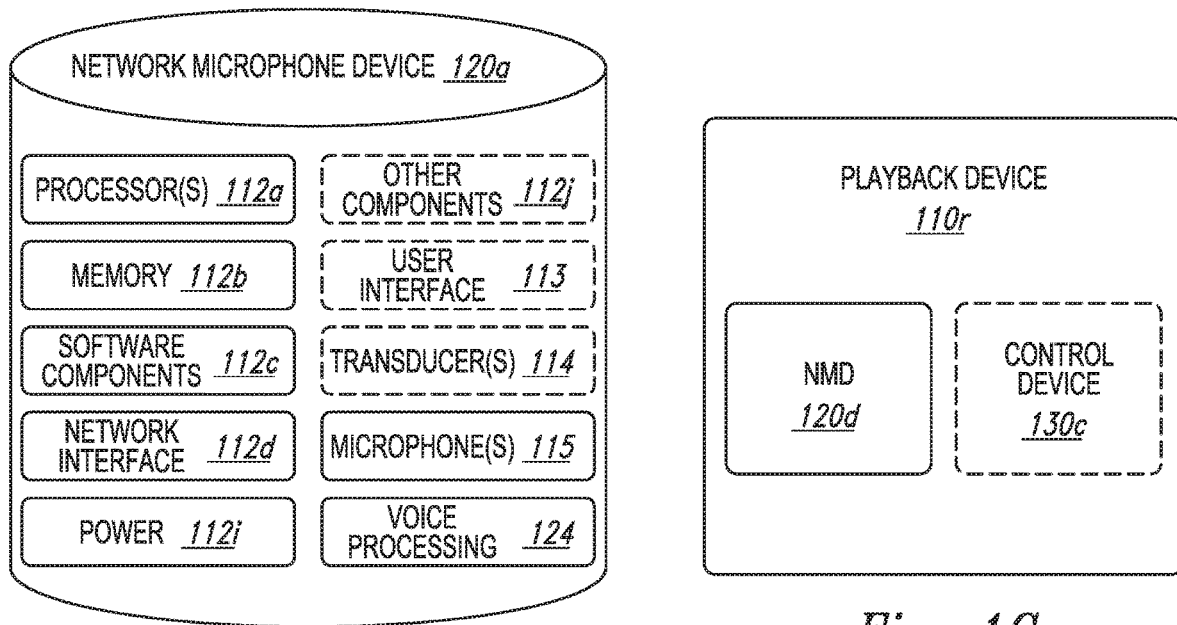
Fig. 1F
Fig. 1G
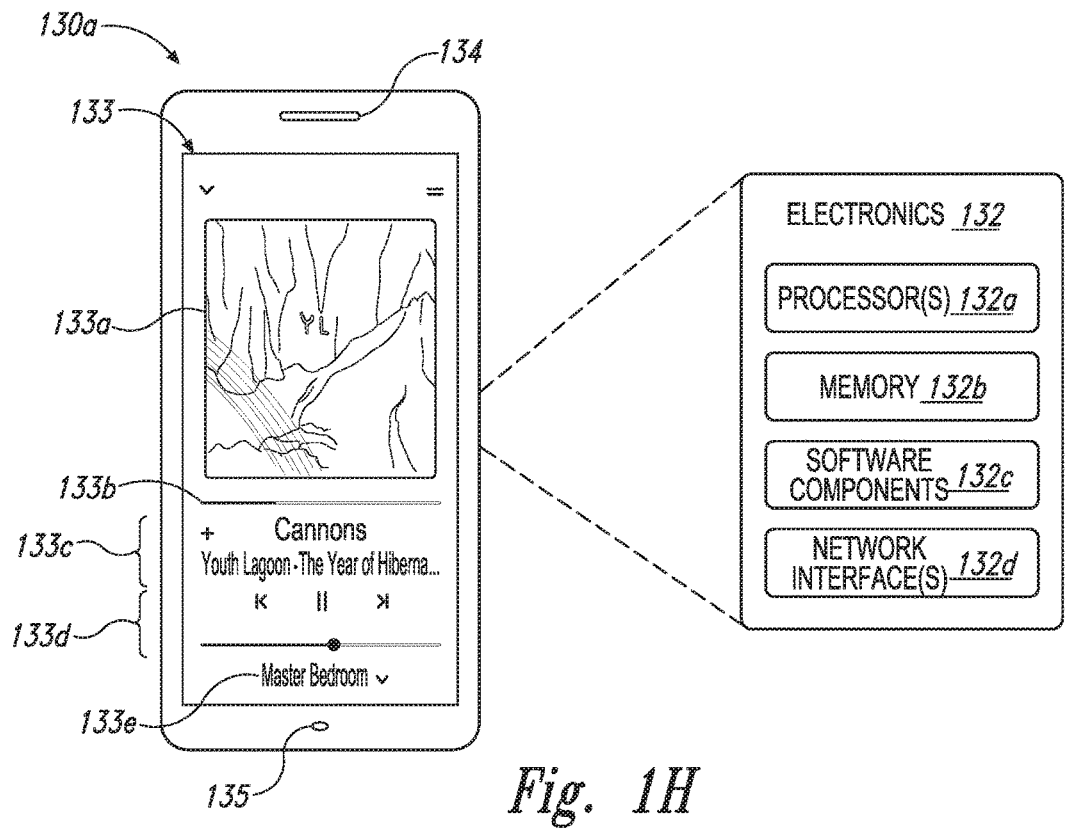
Fig. 1H

PLAYING MEDIA CONTENT IN RESPONSE TO DETECTING ITEMS HAVING CORRESPONDING MEDIA CONTENT ASSOCIATED THEREWITH

CROSS-REFERENCE TO RELATED APPLICATION

This application is a continuation of U.S. application Ser. No. 16/746,912, titled "Playing Media Content in Response to Detecting Items Having Corresponding Media Content Associated Therewith," filed on Jan. 19, 2020; U.S. application Ser. No. 16/746,912 claims priority to U.S. Provisional App. 62/794,654, titled "Playing Media Content in Response to Detecting Items Having Corresponding Media Content Associated Therewith," filed on Jan. 20, 2019, and now expired. The entire contents of U.S. application Ser. No. 16/746,912 and U.S. Prov. App. 62/794,654 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
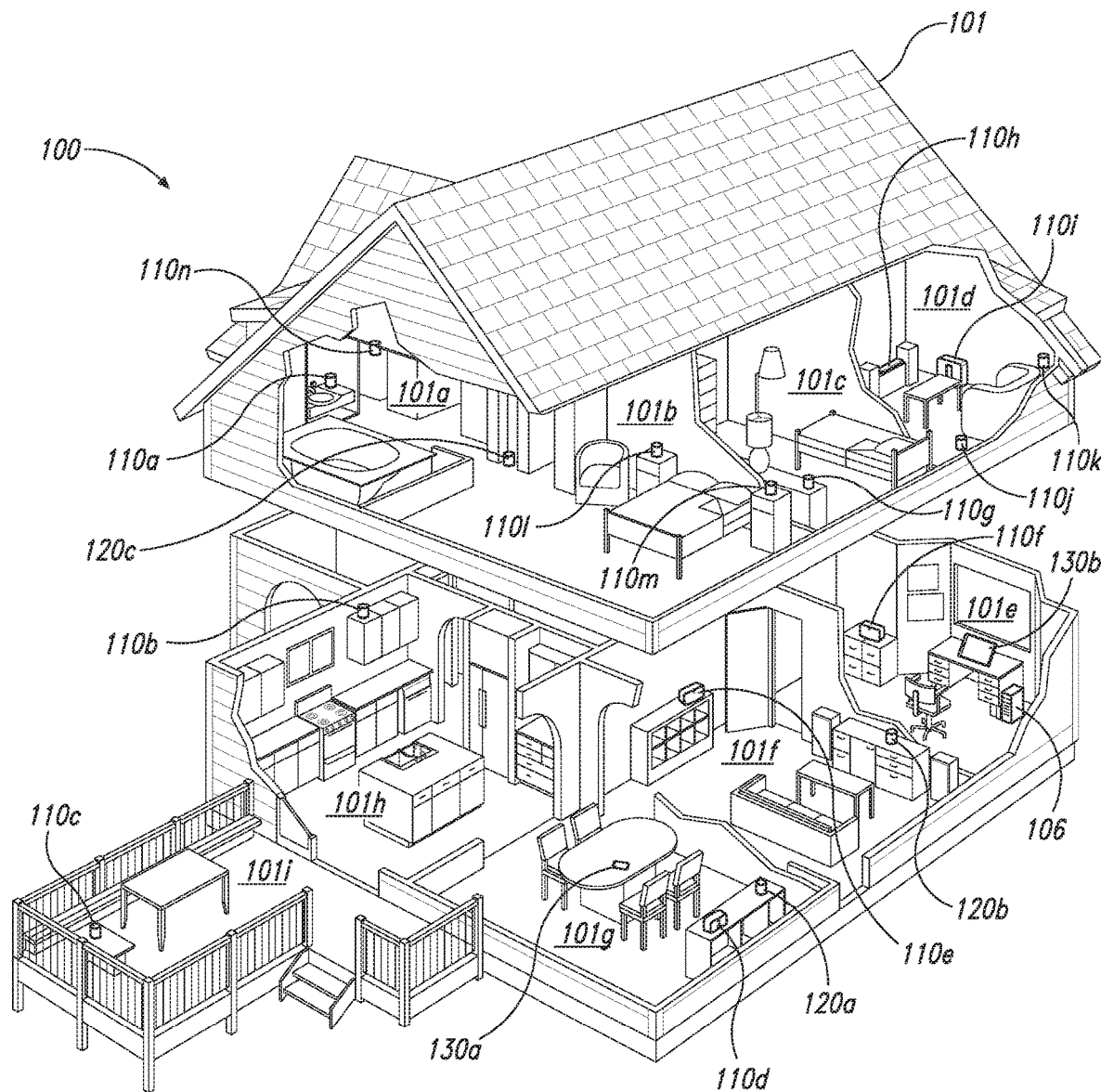
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

It is desirable in some instances for a playback device or a group of playback devices to play certain media content in response to certain detected conditions. For example, it is desirable in some instances for a media playback system comprising one or more playback devices to play certain media content associated with a specific physical item or group/configuration of items when that physical item or group/configuration of items is within an area or location where the media playback system is in operation.

In some example scenarios, the physical item is toy, playset, or game. For an immersive play experience, the media playback system plays media content (audio and/or video) associated with the toy, playset, or game. The media content may include audio tracks, sound effects, dialog, video segments, video effects, audio/video content/effects, and/or portions thereof. In operation, the media playback system is configured to play one or more of such media content individually or in combination in response to certain conditions. Such conditions may include, but are not limited to: (i) when the physical item is within an area or location where the media playback system is operating, (ii) when a button/trigger on the physical item is actuated or activated within an area or location where the media playback system is operating, and/or (iii) when a particular combination of items are within an area or location where the media playback system is operating.

Some embodiments of the systems and methods disclosed herein include, among other features, determining that an item is present within an area comprising a playback device, wherein the item has corresponding media content associated therewith. And in response to determining that the item is present within the area comprising the playback device, playing the media content corresponding to the item via one or more playback devices. Some embodiments disclosed herein play different media content associated with a physical item and/or alter playback parameters for playing back media associated with the physical item as the physical item moves within an area and/or between areas comprising multiple different playback devices.

Some embodiments additionally or alternatively play media content associated with virtual items that exist within an augmented reality space. Some such embodiments include determining whether a virtual item is present within an augmented reality space at least partially coextensive with an area comprising a location of the first playback device, wherein the virtual item has corresponding media content associated therewith, wherein the media content comprises first content and second content. In response to determining that the virtual item is present within the augmented reality space at least partially coextensive with the area comprising the location of the first playback device, playing the first content corresponding to the virtual item. And in response to determining that the virtual item is not present within the augmented reality space at least partially coextensive with the area comprising the location of the first playback device, playing the second content corresponding to the virtual item.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
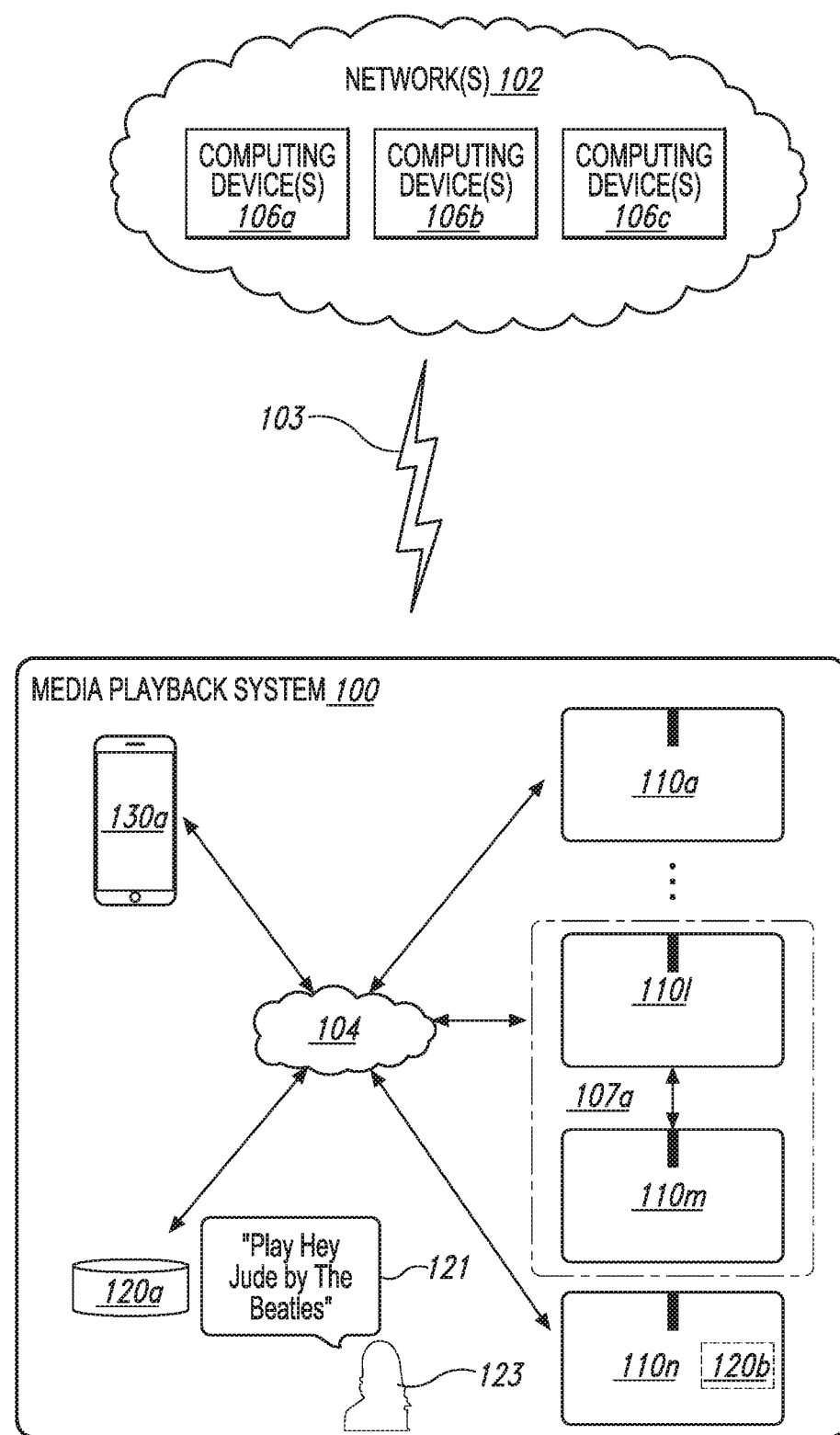
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
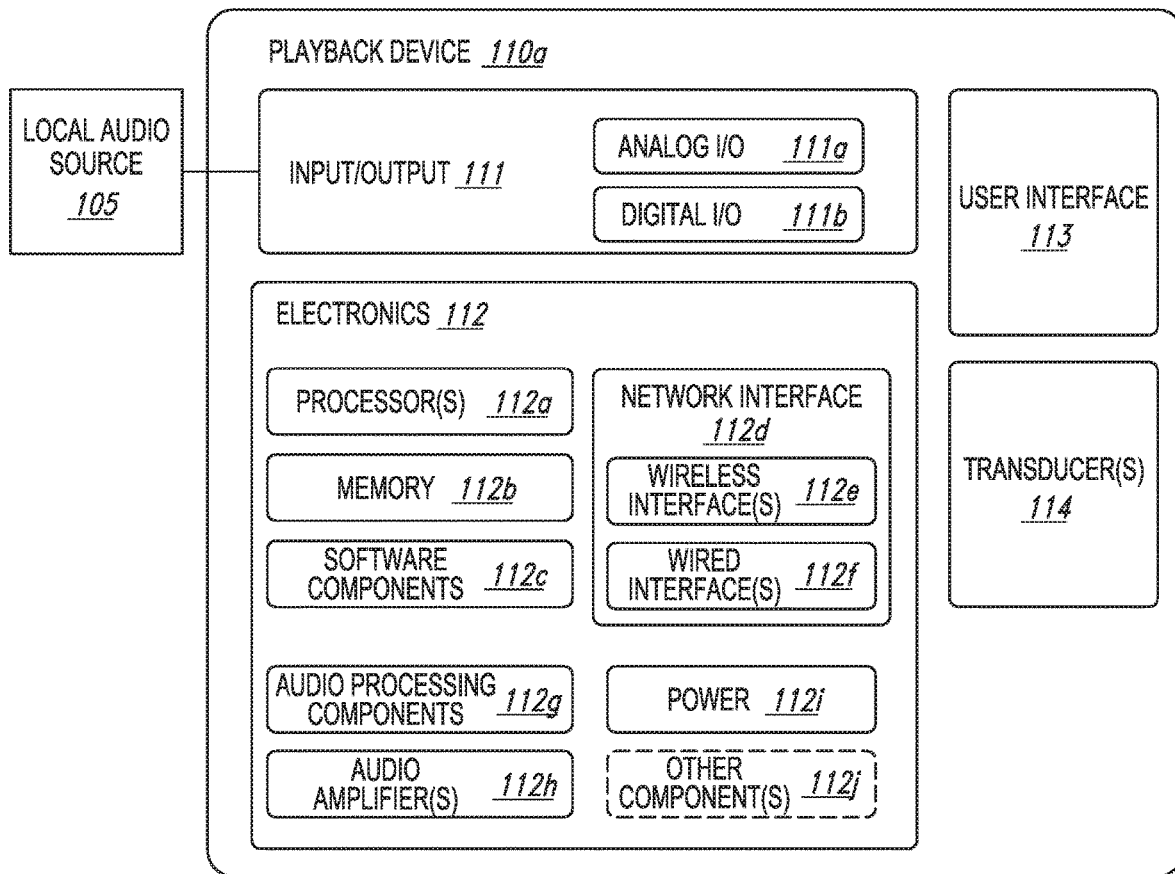
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
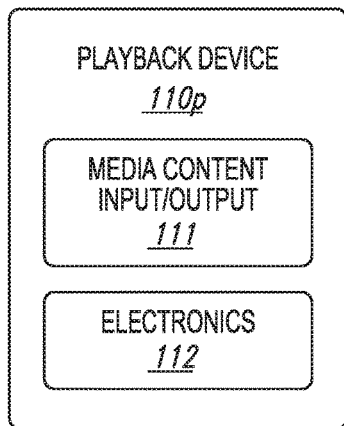
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
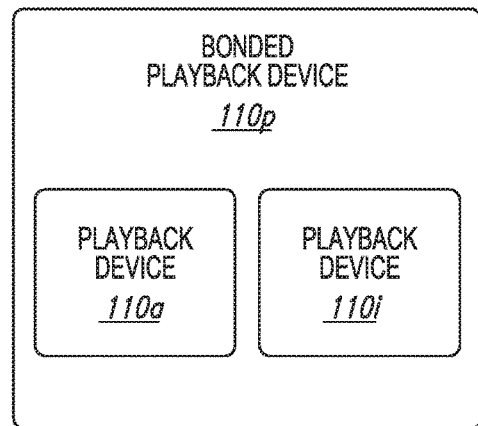
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad'), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
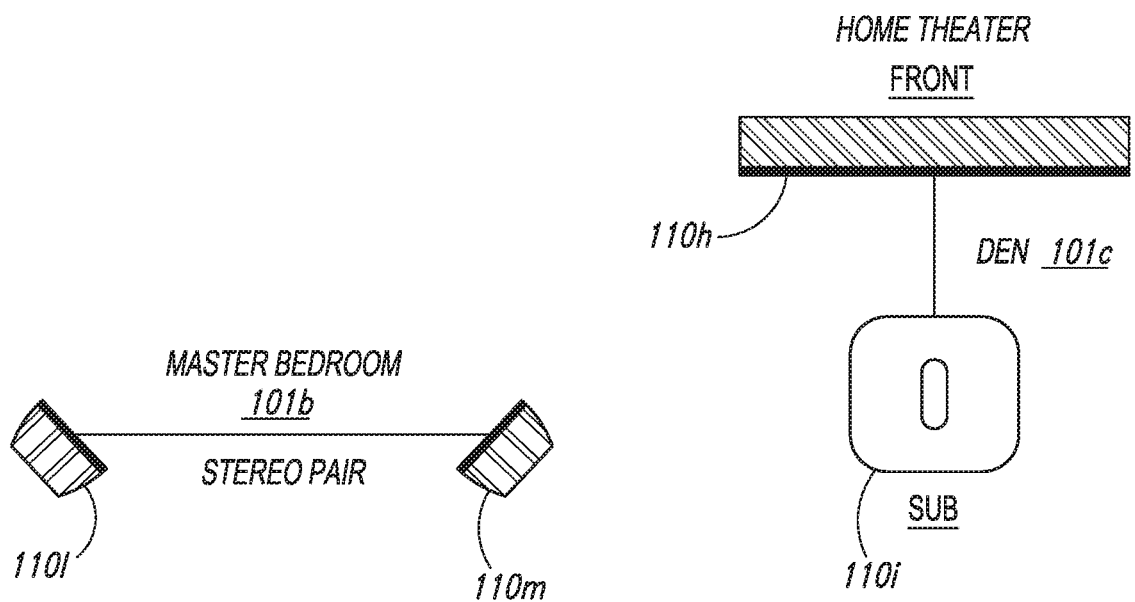
FIG. 1F shows a block diagram of a network microphone device.
FIG. 1G shows a block diagram of a playback device.
FIG. 1H shows a partially schematic diagram of a control device.
FIGS. 1-I through 1L show schematic diagrams of corresponding media playback system zones.
FIG. 1M shows a schematic diagram of media playback system areas.
Figures 1K, 1L:
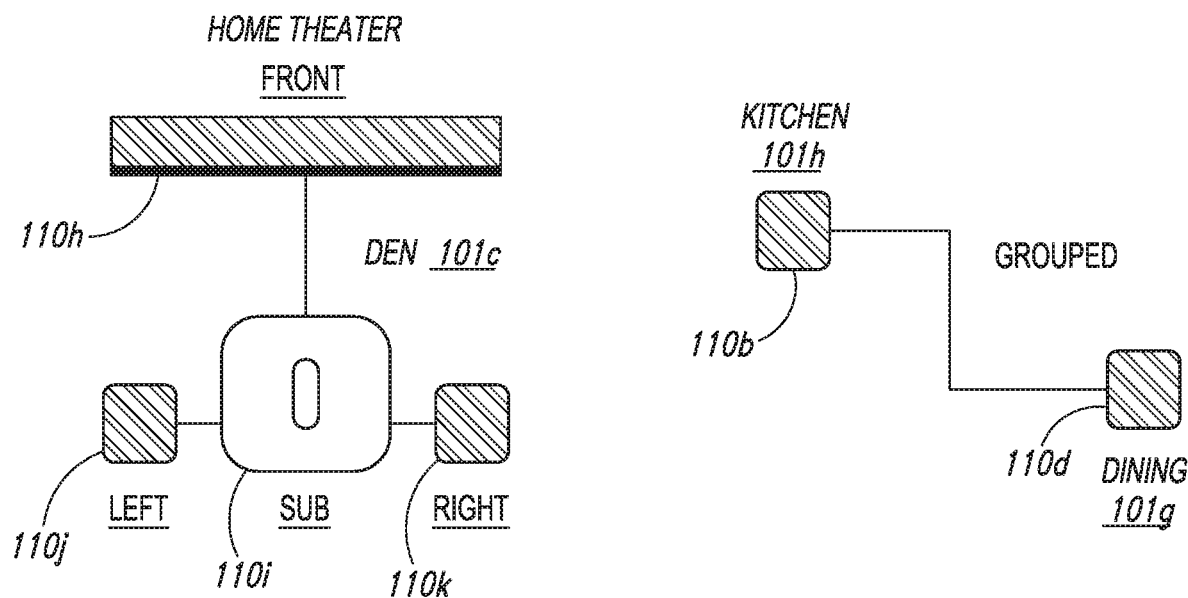
Figure 1M:
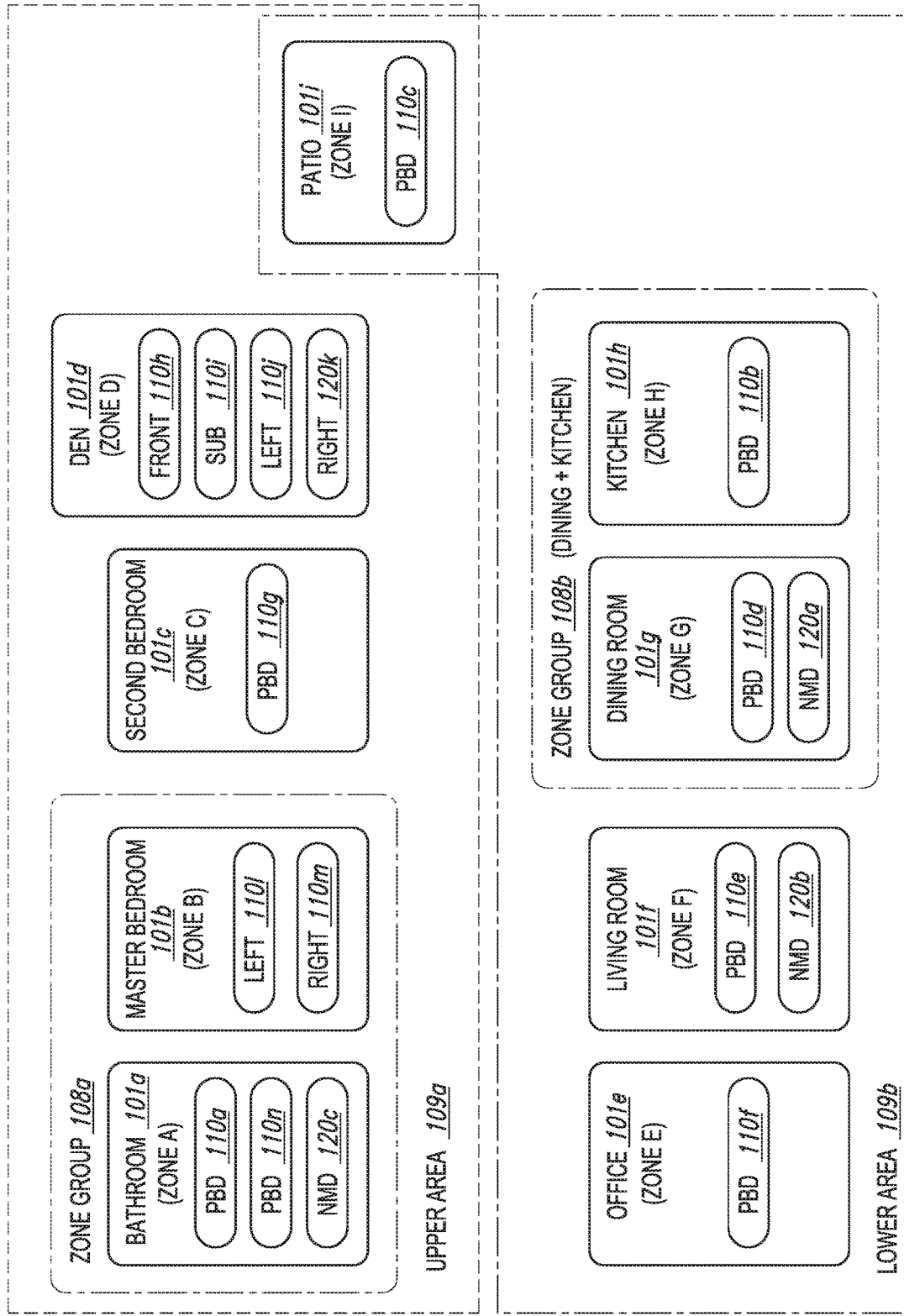

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
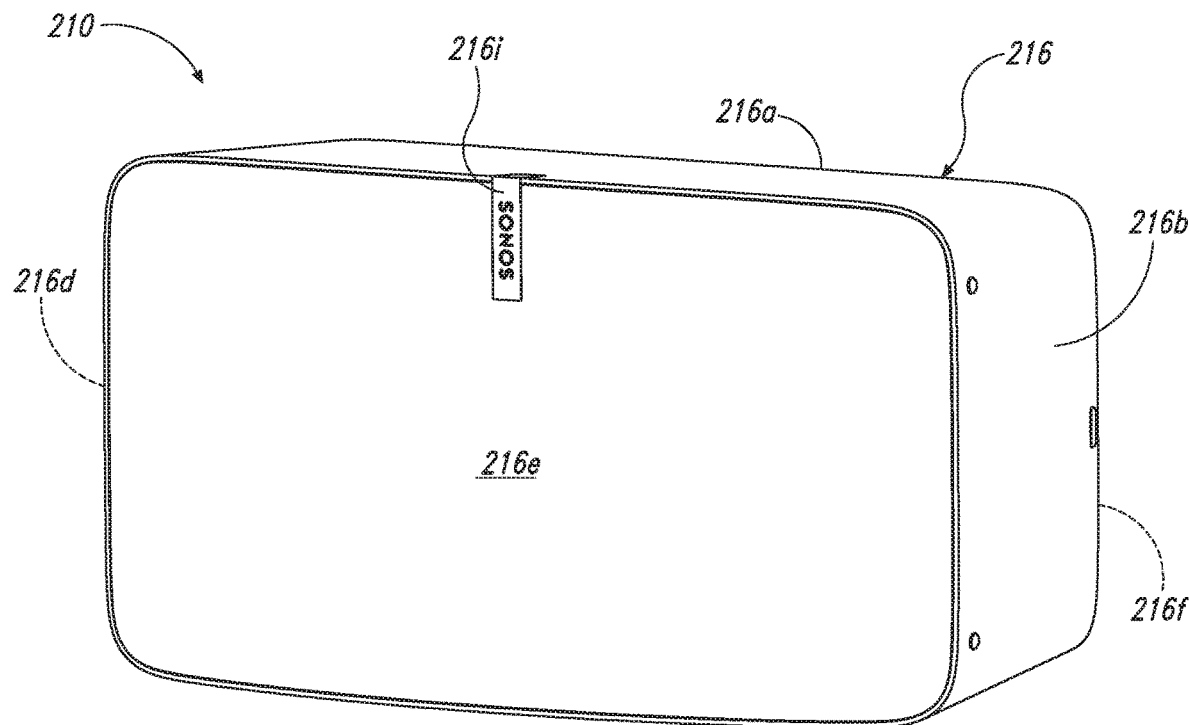
FIG. 2A shows a front isometric view of a playback device configured in accordance with aspects of the disclosed technology.
Figure 2B:
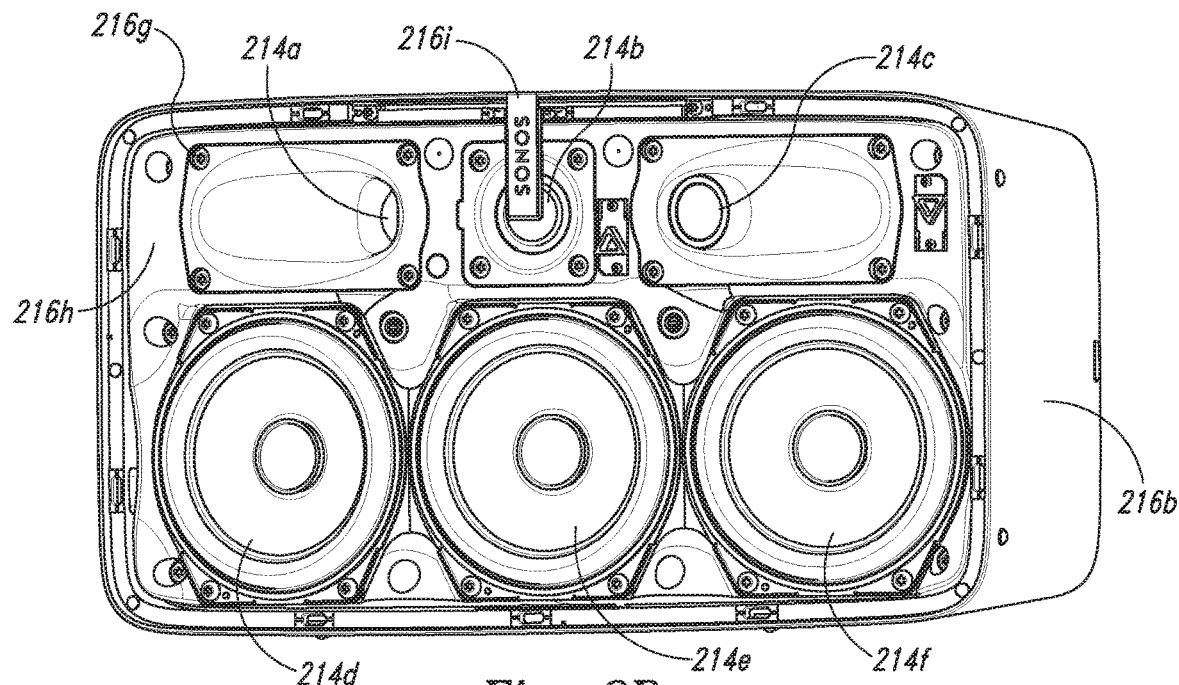
FIG. 2B shows a front isometric view of the playback device of FIG. 3A without a grille.
Figure 2C:
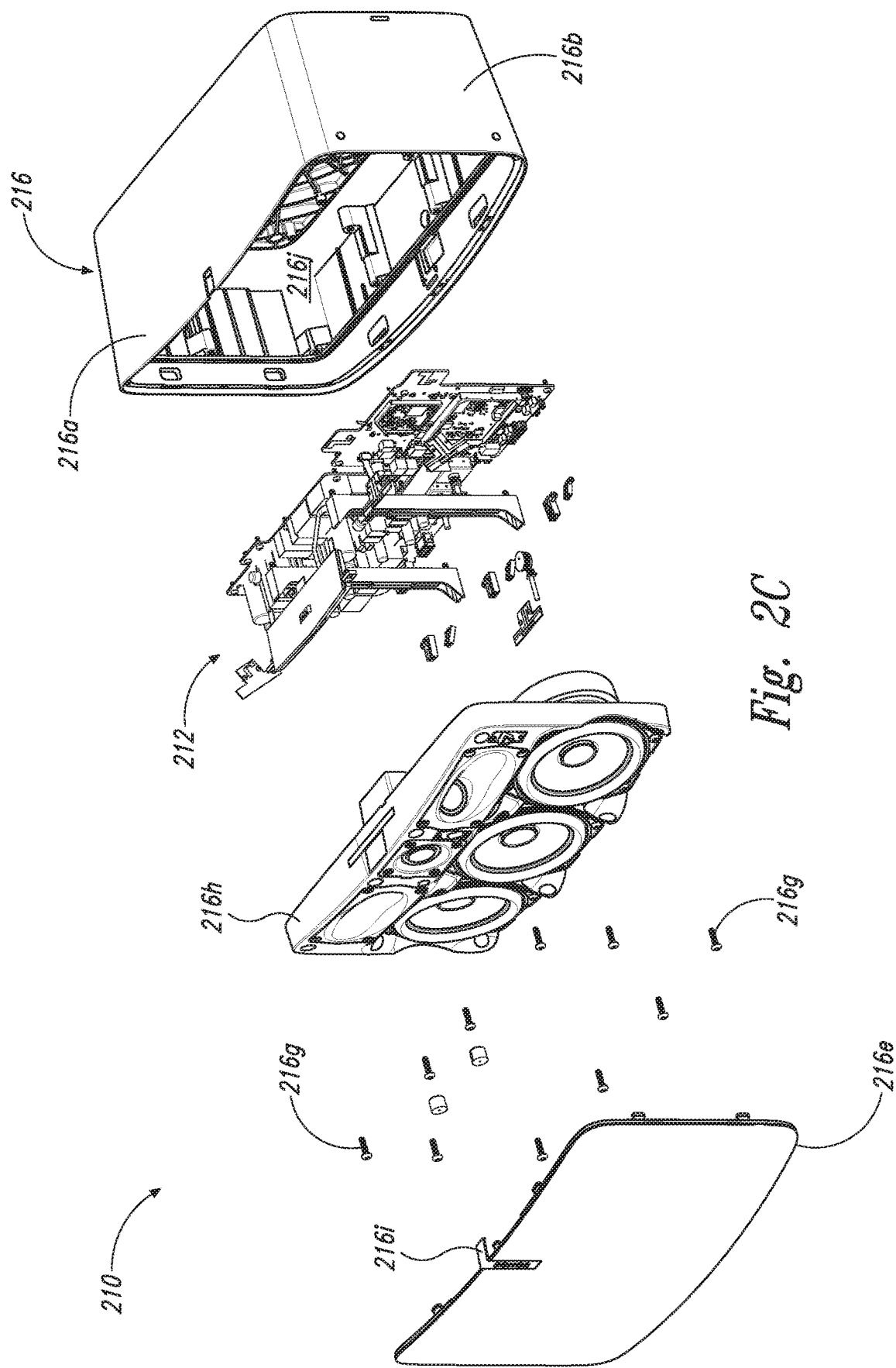
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
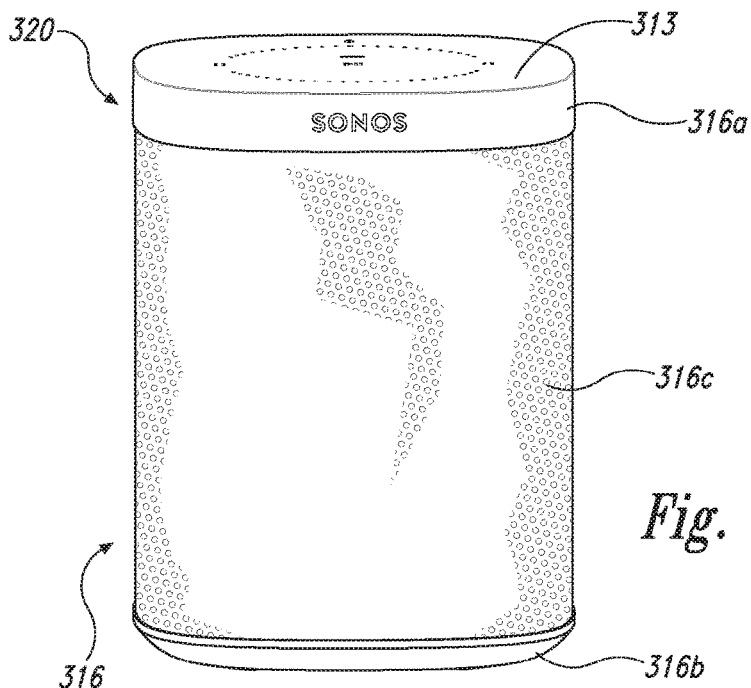
FIG. 3A shows a front view of a network microphone device configured in accordance with aspects of the disclosed technology.
Figure 3B:
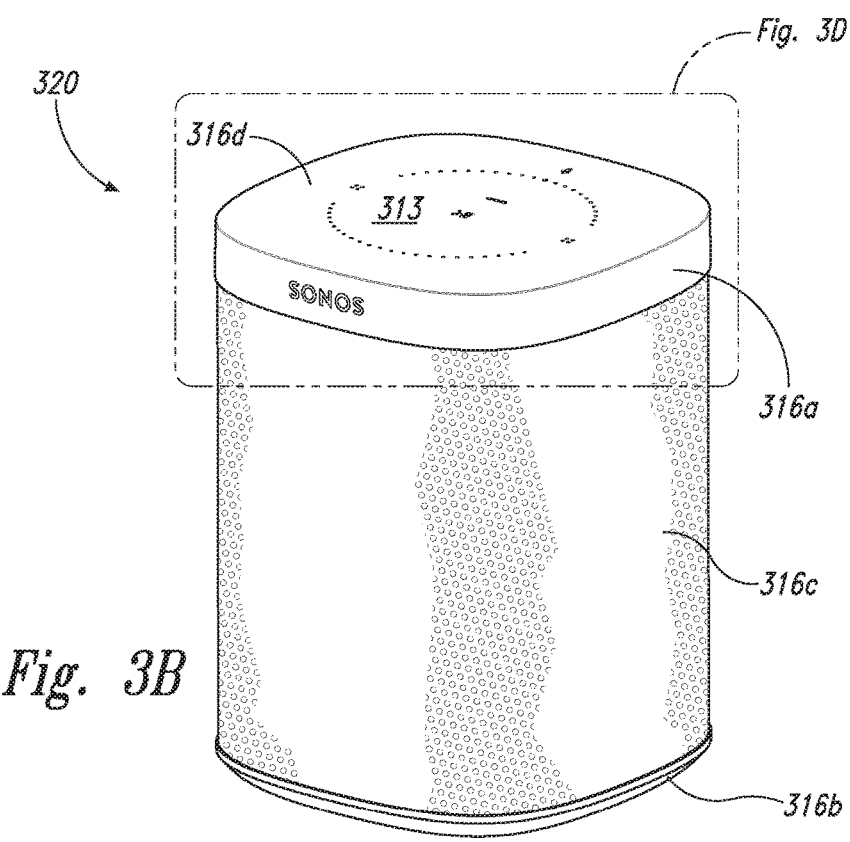
FIG. 3B shows a side isometric view of the network microphone device of FIG. 3A.
Figure 3C:
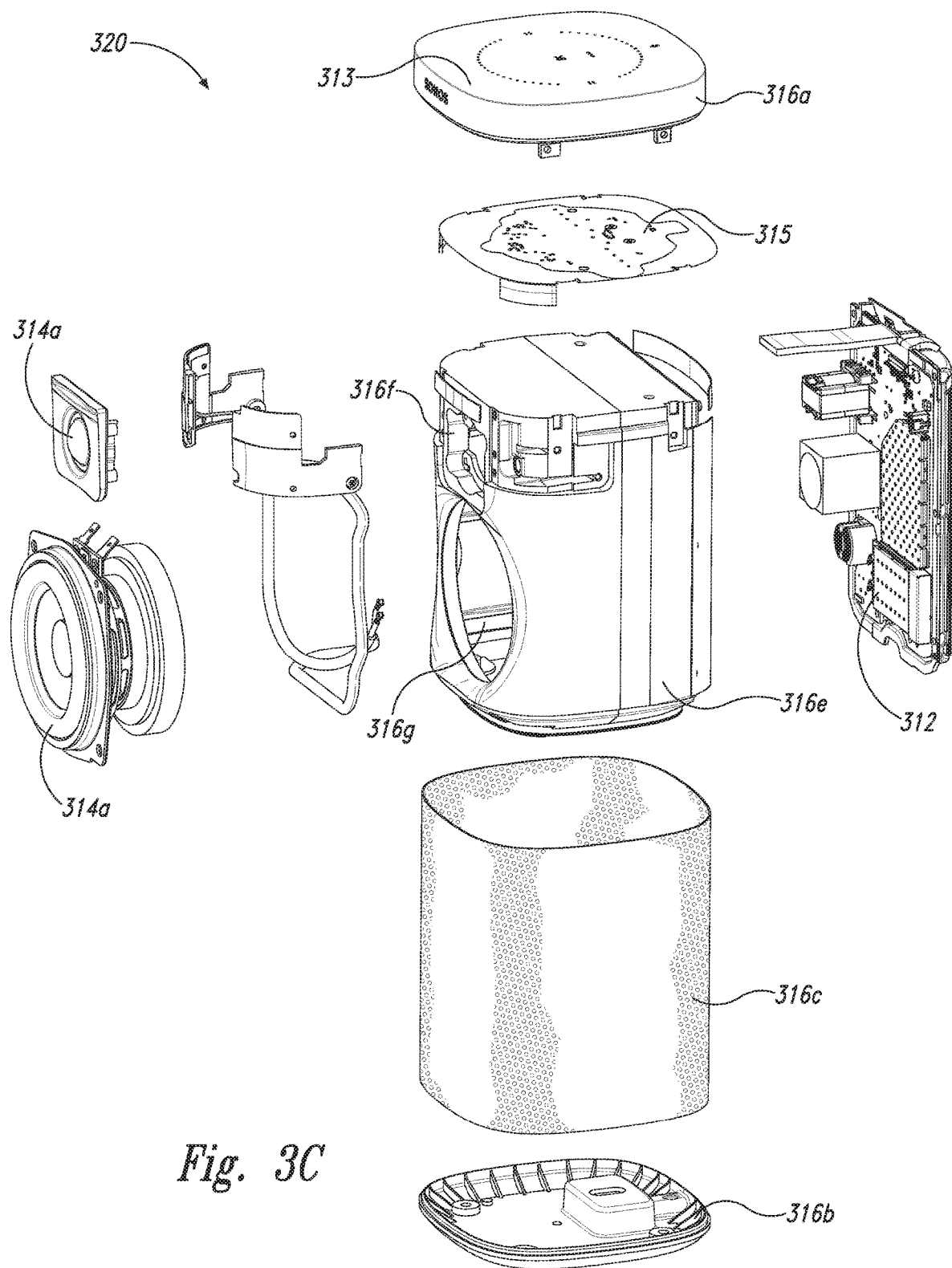
FIG. 3C shows an exploded view of the network microphone device of FIGS. 3A and 3B.
Figure 3D:
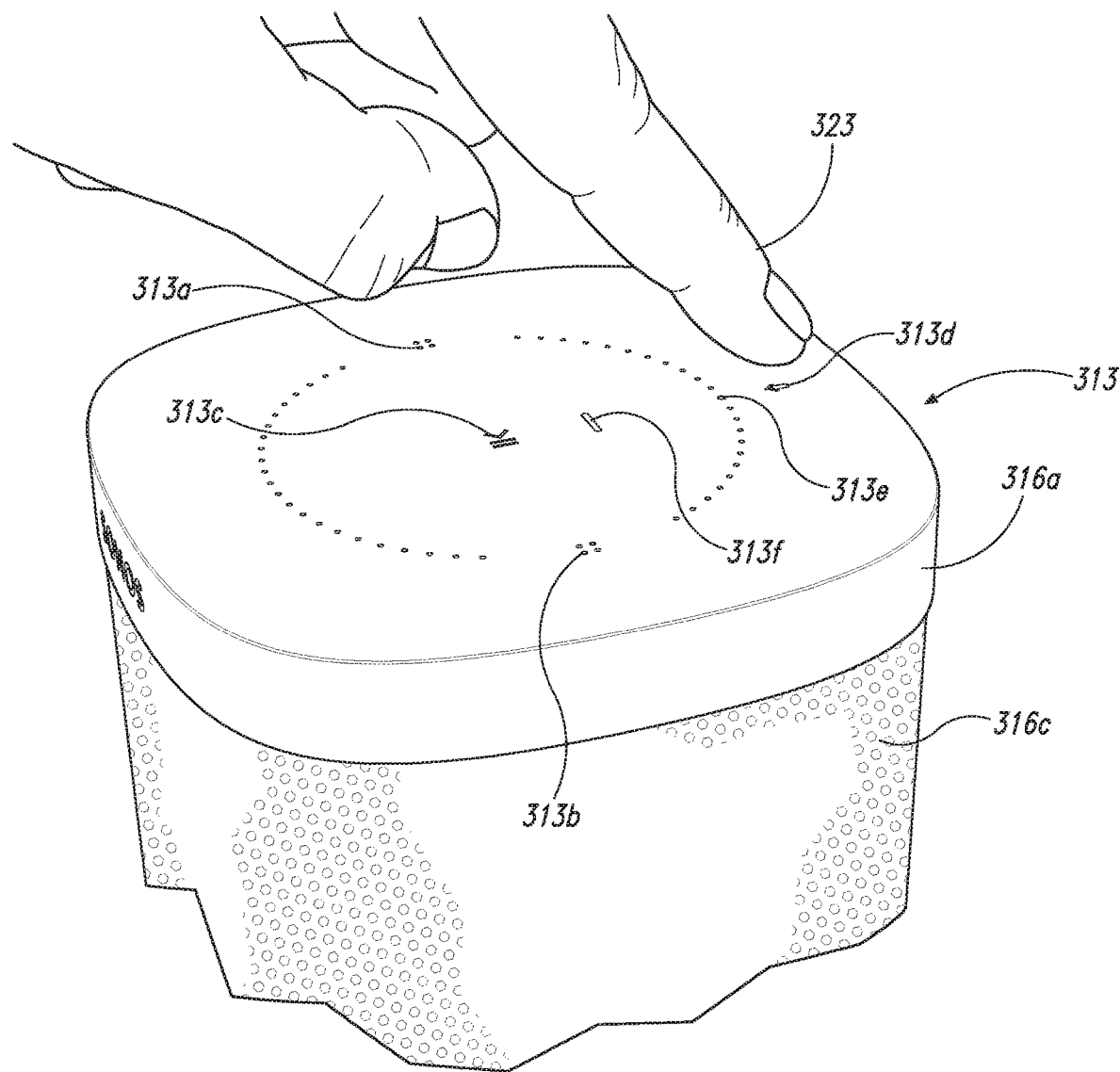
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
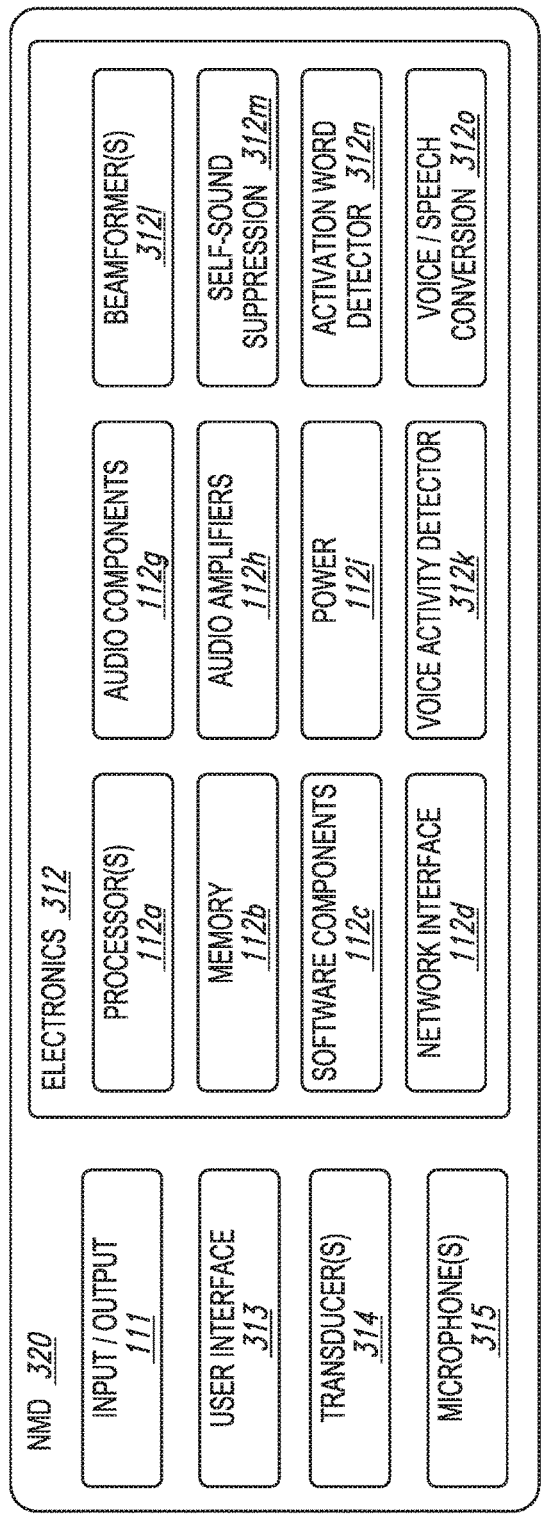
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
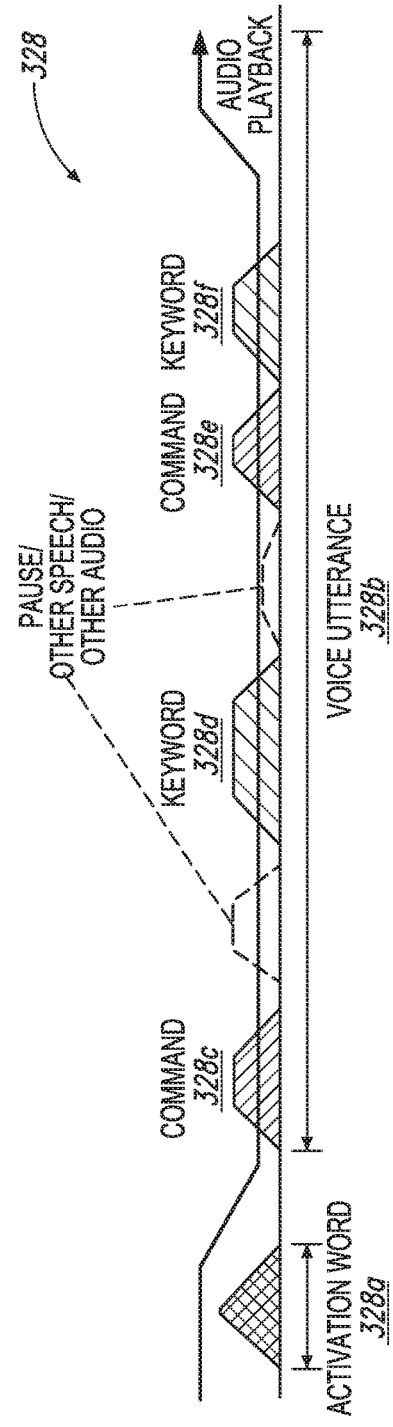
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
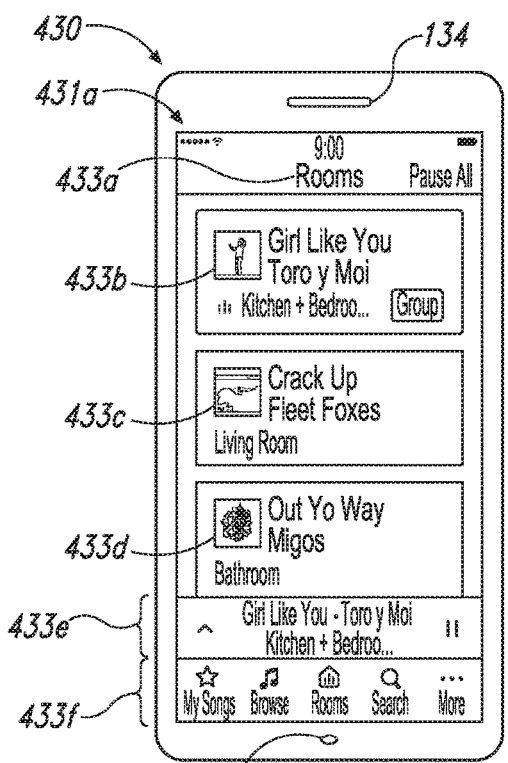
FIGS. 4A-4D show schematic diagrams of a control device in various stages of operation in accordance with aspects of the disclosed technology.
Figure 4B:
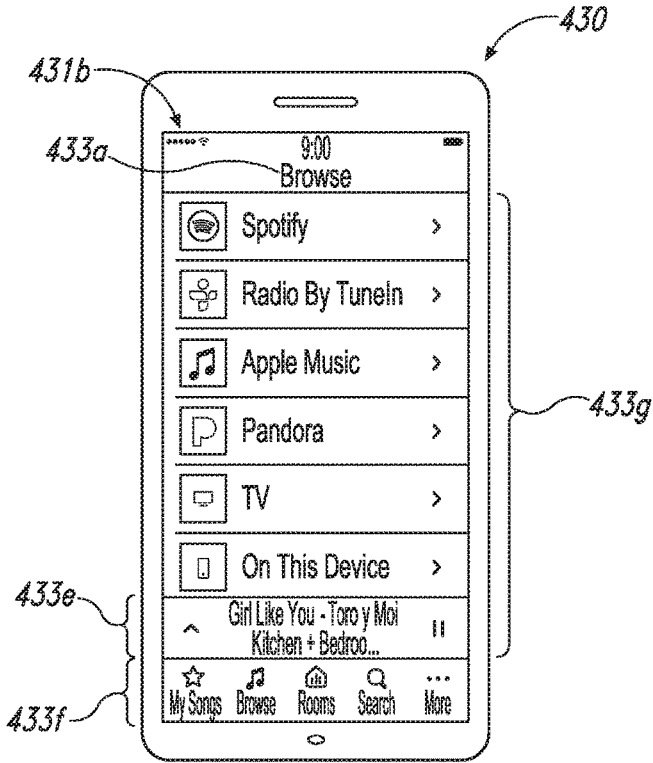
Figure 4C:
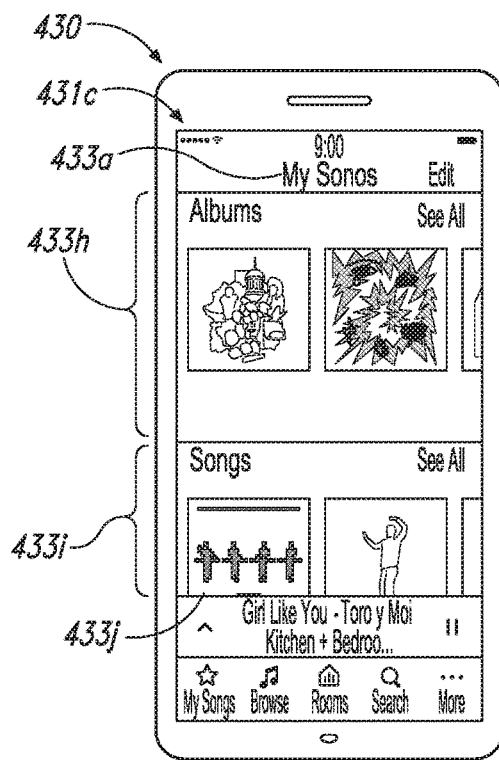
Figure 4D:
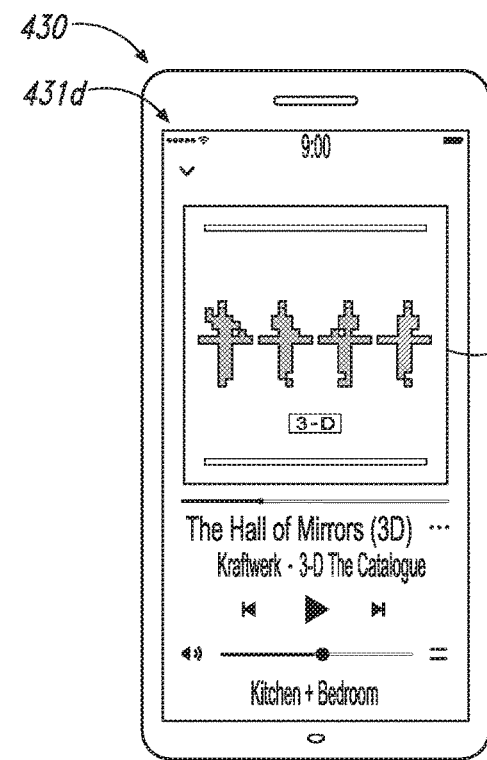

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
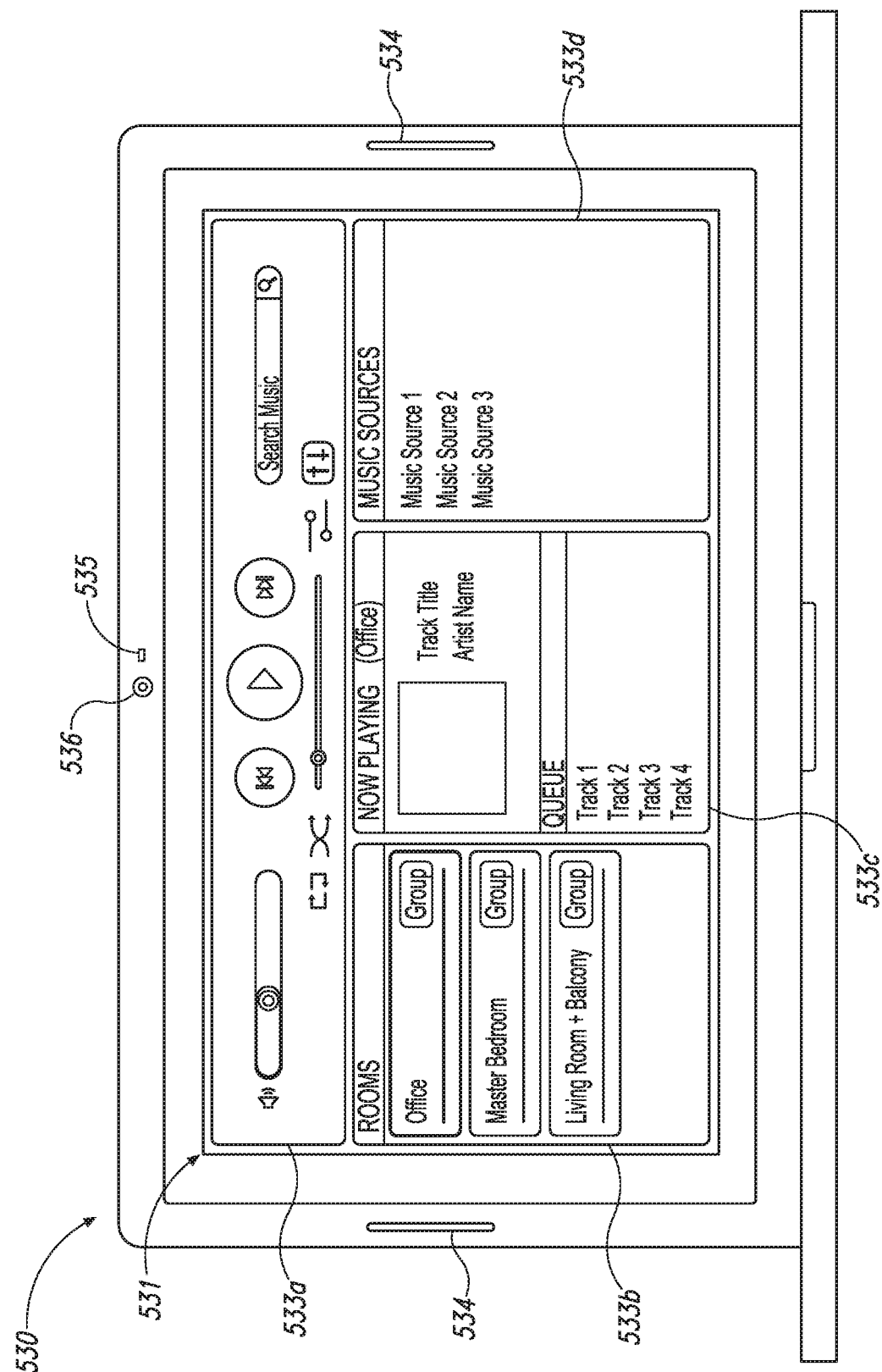
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
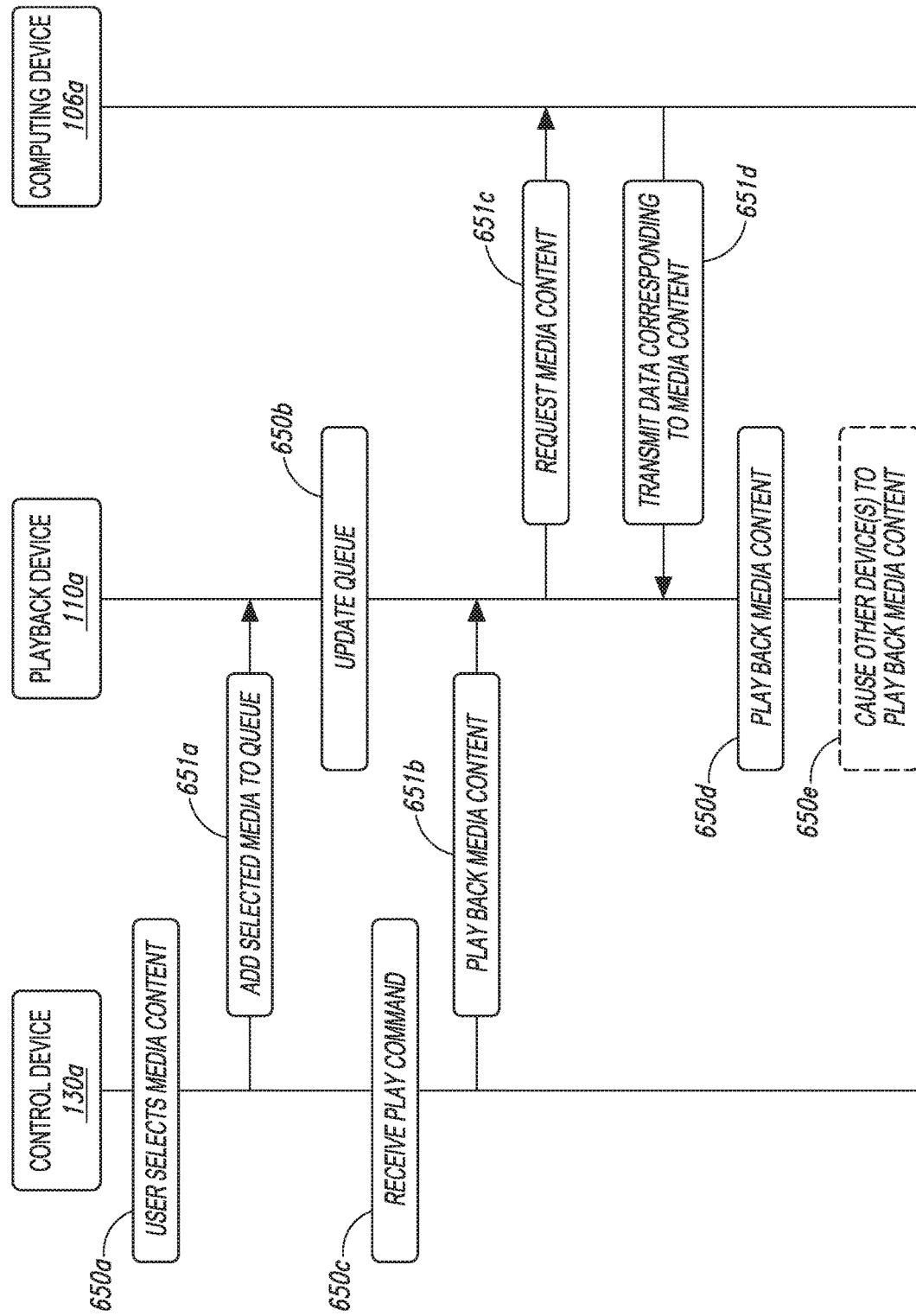
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Example Embodiments

As mentioned above, some embodiments of the systems and methods disclosed herein include, among other features, determining that a physical item is present within an area comprising a playback device, wherein the physical item has corresponding media content associated therewith. And in response to determining that the physical item is present within the area comprising the playback device, one or more playback devices play the media content corresponding to the item via one or more playback devices. Some embodiments disclosed herein play different media content associated with a physical item and/or alter playback parameters for playing back media associated with the physical item as the physical item moves within an area and/or between areas comprising multiple different playback devices.

Some embodiments additionally or alternatively play media content associated with one or more virtual items that exist within an augmented reality space. Some such embodiments include determining whether a virtual item is present within an augmented reality space at least partially coextensive with an area comprising a location of a playback device, wherein the virtual item has corresponding media content associated therewith, and wherein the media content comprises at least first content and second content. In response to determining that the virtual item is present within the augmented reality space at least partially coextensive with the area comprising the location of the playback device, the playback device plays the first content corresponding to the virtual item. And in response to determining that the virtual item is not present within the augmented reality space at least partially coextensive with the area comprising the location of the playback device, the playback device plays the second content corresponding to the virtual item.

A. Example System Architecture Overview

Figure 7:
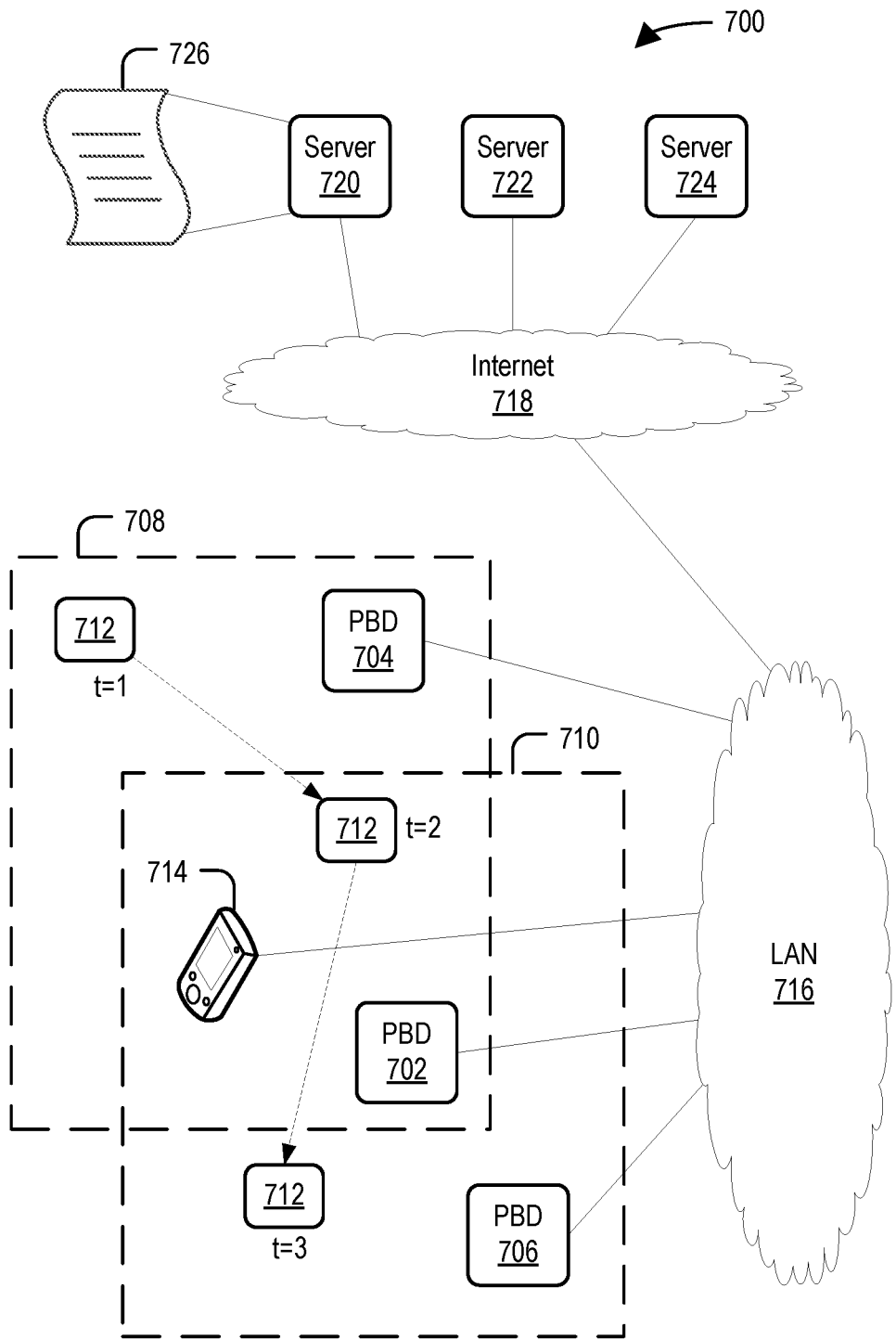
FIG. 7 shows an example network operating environment sufficient for implementing various aspects of some embodiments.

FIG. 7 shows an example system architecture overview showing an operating environment 700 sufficient for implementing various aspects of multiple embodiments of the disclosed systems and methods.

Environment 700 includes a media playback system comprising a first playback device (PBD) 702, a second PBD 704, and third PBD 706. PBDs 702, 704, and 706 are similar to or the same as any of the PBDs or networked microphone devices (NMDs) disclosed and/or described herein, or any other media playback device now known or later developed. In some embodiments, PBDs 702, 704, and 706 may be configured to play audio content, video content, and/or a combination of audio and video content according to any of the playback mechanisms disclosed or described herein. In operation, the media playback system could have more or fewer PBDs than the three shown in FIG. 7.

The PBDs 702, 704, and 706 are connected via a local area network (LAN) 716 to the Internet 718 and configured to play media content. In some embodiments, the PBDs 702, 704, and 706 obtain at least some media content from one or more servers 720, 722, and 724 according to any of the media retrieval mechanisms disclosed or described herein. In some embodiments, one or more of the servers 720-724 store media content for playback by the PBDs 702-706. In some embodiments, a first server 720 maintains a cloud queue 726 with pointers to network locations (e.g., URLs/URIs) where media content is stored on a second server 722. Some embodiments include a playback device (e.g., PBD 702) storing at least a portion of the cloud queue 726 in local memory at the playback device, and using the pointers contained in the locally-stored portion of the cloud queue to obtain media content from one or more servers (e.g., servers 720, 722, and/or 724).

In example environment 700, PBD 702 and PBD 704 are configured to play media content in area 708, and PBD 706 is configured to play media content in area 710. In some embodiments, area 708 corresponds to a first room in a home, and area 710 corresponds to a second room in the home. In example environment 700, area 708 overlaps with area 710, but overlapping areas are not necessary (and may not be desirable) for all embodiments.

In some embodiments, PBD 702 and PBD 704 are grouped to play back media content in synchrony with each other within an area 708. PBD 702 and PBD 704 may be grouped as a synchrony group, bonded playback device, stereo pair, surround sound, any other type of grouping disclosed and described herein, and/or any other type of playback device grouping now known or later developed. In some embodiments, PBD 702 and PBD 704 may additionally or alternatively be configured to play certain media content with each other in a coordinated fashion even if PBD 702 and PBD 704 do not play that certain media together in synchrony.

In some embodiments, PBD 706 may not be initially grouped with PBD 702 or PBD 704 to play back media content in synchrony. However, as explained in further detail herein, PBD 706 may be temporarily grouped with one or both of PBD 702 and/or PBD 704 to play media content in synchrony. In some embodiments, PBD 706 may additionally or alternatively be configured to play certain media content with one or both of PBD 702 and/or PBD 704 in a coordinated fashion even if PBD 706 does not play that certain media together with PBD 702 and/or PBD 704 in synchrony.

For example, in some embodiments, PBD 706 may be configured to play certain media content in synchrony with, or at least in a coordinated fashion with, one or both of PBD 702 and/or PBD 704 in some circumstances, including but not limited to circumstances where item 712 is at location where area 708 overlaps with area 710 (e.g., a hallway between rooms, or a transitional area between a kitchen and den, or similar overlapping area) and/or a location other between area 708 and area 710 but not necessarily within either area. In operation, a user can define areas 708, 710, and/or other different areas. Alternatively, areas 708, 710, and/or other different areas may be based on room names or other names assigned to individual playback devices during system setup. For example, if PBD 702 and PBD 704 are named Den-L and Den-R, respectively, then area 708 may correspond to the "Den."

Environment 700 also includes a physical item 712. FIG. 7 shows physical item 712 being moved through areas 708 and 710 over time, e.g., at time t=1, t=2, and t=3. However, physical item 712 need not move through areas 708 and 710 to realize advantages of some embodiments.

In some embodiments, the physical item 712 comprises any of a toy, a component of a toy, a playset (comprising a set of toys or toy components), a game, a game piece, a die or set of dice, a game set (comprising a set of game pieces, gameboard, and/or dice), or another physical item having at least some of the physical item characteristics described herein.

In some examples, the physical item 712 is a building block, such as a LEGO® brick, block, or other component provided by The LEGO Group. In some examples, the physical item 712 comprises a set of LEGO® bricks, blocks, or other components that have been arranged or combined in a specific way. Examples of such multi-part items are described in more detail with reference to FIGS. 8 and 9. In still further examples, an individual physical item 712

(including a multi-part item) may be one of multiple physical items in a toy, playset, game, and so on. In such examples, each physical item may have its own corresponding media content, and in some instances, certain combinations of individual physical items may have specific corresponding media content, too.

Environment 700 in some embodiments also includes a computing device 714. FIG. 7 shows computing device 714 as a smartphone. But computing device 714 can be a tablet computer, laptop computer, a networked microphone device (e.g., an Amazon Echo, Apple HomePod, Google Home, or similar), or any other computing device with one or more processors and networking interfaces. In some embodiments, computing device 714 runs a software application configured to control one or more aspects of the media playback system comprising PBDs 702-706. In some embodiments, computing device 714 additionally or alternatively runs a software application configured to interface with and, in some instances, control one or more aspects of the physical item 712. Some embodiments may include more than a single computing device. In some embodiments, a playback device (e.g., PBD 702-706) may perform one or more functions of a computing device (e.g., computing device 714), and a computing device (e.g., computing device 714) may perform one or more functions of a playback device (e.g., PBD 702-706). Additionally, in some embodiments, the physical item 712 may perform one or more functions of a computing device and/or playback device.

In some embodiments, one or more of computing device 714, physical item 712, and PBDs 702-706 are configured to communicate with one or more of each other via any one or more wireless communication protocols, e.g., WiFi, Bluetooth, Radio Frequency Identification (RFID), Near Field Communications (NFC), or any other wireless protocol suitable for data transmission now known or later developed. For example, in some embodiments, (i) PBDs 702-706 communicate with each other via WiFi over the LAN 716, (ii) computing device 714 and PBDs 702-706 communicate with each other via WiFi over the LAN 716, (iii) computing device 714 and PBDs 702-08 communicate with each other via Bluetooth, (iv) computing device 714 and physical item 712 communicate with each other via WiFi over the LAN 716; (v) computing device 714 and physical item 712 communicate with each other via one or more of Bluetooth, RFID, and/or NFC; and/or (vi) PBDs 702-706 communicate with physical item 712 via one or more of Bluetooth, RFID, and/or NFC. Additionally, or alternatively, one or more of computing device 714, physical item 712, and PBDs 702-706 are configured to communicate with one or more of each other via audio signals, including but not limited to ultrasonic audio signals.

In some embodiments, the physical item 712 comprises one or more attributes and/or capabilities that enable it to be detected and/or identified via one or more optical-based detection procedures, radio frequency (RF) based detection procedures, and/or audio-based detection procedures, as described in more detail below, by any one or more of the computing device 714, the PBDs 702-706, and/or the one or more servers 720-724, individually or in combination with each other.

The physical item 712 is also associated with corresponding media content for playback by a playback device (or a group of playback devices) when the physical item 712 is within an area comprising the playback device, individually or in combination with one or more other triggering events. The media content be any one or more of audio content, video content, and/or audio/video content, including but not limited to one or more audio tracks, songs, spoken-word tracks, ambient music or sounds, soundscapes, sound effects, ambient video, video effects, video content, or any other type of audio, video, and/or audio/video content now known or later developed.

In some embodiments, the physical item 712 comprises one or more processors and at least one communication interface. In some such embodiments, the physical item 712 is configured to "pair" or similarly connect to a playback device (e.g., any of PBDs 702-706) and/or a computing device (e.g., computing device 714) when the physical item 712 is initially powered on.

In some embodiments, a playback device (e.g., any of PBDs 702-706) may enter a "listen mode" in response to a voice command received from a user. For example, a user may say, "Hey Sonos, listen for my new LEGOs®" or another voice command that causes the playback device to listen for an RF pairing signal emitted by the physical item 712. While in the "listen mode," the playback device listens for the RF signal emitted from the physical device 712. The RF signal may be any of a Bluetooth, WiFi, RFID, and/or NFC signal.

In some examples, entering into the "listen mode" causes the playback device to listen for a pairing signal (or pairing request) via a particular RF signal. For example, entering "listen mode" may cause the playback device to listen for a pairing signal via a Bluetooth transmission. In some embodiments, entering into the "listen mode" may cause the playback device to listen for a pairing signal via multiple (or perhaps all) transmission schemes. For example, entering the "listen mode" may cause the playback to listen for a pairing signal via its WiFi, Bluetooth, RFID, and/or NFC receivers. For some wireless transmission protocols, listening for a pairing signal may include first transmitting a polling signal that causes the physical device 712 to respond with the pairing request. For some multi-channel wireless protocols, listening for the pairing signal may include listening for the signal via a specific channel of the multi-channel wireless protocol.

In some embodiments, the pairing signal emitted by the physical item 712 may include one or more of a temporary address or other network identifier and an indication of the network protocols via which the physical device 712 would like to pair with the playback device and/or perhaps the computing device. In one example, the physical device 712 may transmit a n RFID signal that includes an indication that physical device 712 wishes to pair via WiFi and a temporary WiFi address via which the playback device (or perhaps computing device) should send network information for communicating via the WiFi network. In response, the playback device (or perhaps computing device) transmits information that allows the physical device 712 to join a WiFi network and then pair with the playback device, or otherwise configure itself for operation with the playback device. In one example, the playback sends the physical device 712 a WiFi network name (e.g., SSID) and network password for accessing the WiFi network, as well as an IP address of on the WiFi network via which the physical device 712 can communicate with the playback device. The physical device 712 uses the network name and network password received from the playback device to join the WiFi network, and after a WiFi router has assigned the physical device 712 an IP address for the WiFi network, the physical device 712 transmits one or more messages to the playback device via the playback device's previously-provided IP address. Once the playback device and physical device 712 are able to communicate with each other via the WiFi network, the two devices can exchange further information to complete the pairing/grouping process.

In some embodiments, the user may have a user account with the manufacturer of the physical item 712 and a user account associated with the playback devices, where both user accounts have been linked together and/or otherwise configured to share information with each other after receiving user consent. When the user purchases the physical item 712 (or a kit comprising the physical item), or perhaps shortly thereafter, one or more servers associated with the manufacturer of the physical item 712 inform one or more servers associated with the playback devices that the user has purchased the physical item 712 (or a kit comprising the physical item 712). The servers associated with the playback devices may then configure one or more of the user's playback devices for operation with the physical item 712.

B. Detecting a Physical Item in an Area Comprising a Playback Device

In operation, in some embodiments, one or more of the servers 720-724 determines that physical item 712 is within an area comprising at least one of the playback devices 702-706. For example, server 720 may determine that physical item 712 is within area 708 comprising PBD 702 and PBD 704. In another example, server 720 may determine that physical item 712 is within area 710 comprising PBD 706 and PBD 702.

One or more of the servers 720-724 may determine that physical item 712 is within an area comprising at least one of the playback devices 702-706 via one or more ways. For example, in some embodiments, server 722 receives at least one indication that the physical item 712 is present within area 708 comprising PBD 702 and 704. The server 722 may receive the indication from the computing device 714, PBD 702, PBD 704, the physical item 712, and/or another server 724 having information regarding the location of physical item 712.

Depending on the embodiment, the indication may comprise an indication that a camera has captured one or more of an image of the physical item 718 and/or an image of an optical code associated with the physical item 712 while the physical item 712 is within area 708 comprising PBD 702 and 704. In some embodiments, after receiving an image or an optical code, a server (e.g., one of servers 720-724) may additionally transmit information to a playback device (e.g., any of playback devices 702-706) that the playback device uses to pair the physical item 712 to the playback device.

The indication may additionally or alternatively comprise an indication that a RF receiver has received an RF transmission emitted from the item, wherein the RF transmission is associated with the physical item 712. In such embodiments, the RF transmission comprises any one or more of (i) an RFID transmission, (ii) a Bluetooth transmission, (iii) a WiFi transmission, or (iv) NFC transmission. The indication may additionally or alternatively comprise an indication that a microphone has received an audio signal (including an ultrasonic audio signal) emitted from the physical item 712, wherein the audio signal is associated with the physical item 712.

In some embodiments, the computing device 714 sends one or more of the above-listed indications to the server 722. In operation, the computing device 714 may be any type of computing device now known or later developed that includes one or more of (i) a camera or optical reader for capturing photographs or reading optical codes, (ii) an RFID detector/reader for reading RFID tags, (iii) a WiFi transceiver for receiving WiFi transmissions, and/or (iv) an NFC reader for reading NFC tags. Examples include smartphones, tablets, smart watches, networked microphone devices (e.g., Sonos One®, Amazon Alexa®, Apple HomePod®, Google Home®, and similar devices), televisions, home cameras, WiFi routers and other WiFi-equipped devices. In some embodiments, the computing device 714 is a component of a game or playset that includes the physical item 712 and/or a computing device specially configured to work with the physical item 712 for the purpose of identifying the physical item's 712 location as well as perhaps other attributes of the physical item 712, e.g., a current configuration, operational state, or other condition of the physical item 712.

In some embodiments, the indication that the computing device 714 sends to the server 722 may additionally include current location information for the computing device 714. Sending current location information for the computing device 714 enables the server 722 (individually or in combination with one or more other computing devices and/or information systems) to determine whether the computing device 714 was within the area 708 comprising PBD 702 and PBD 704 when it captured image data (e.g., photo and/or optical code) of the physical item 712, received the RF transmission from the physical item 712, and/or received the audio signal transmission from the physical item 712. In such scenarios, the location information can be based on any one or more of (i) GPS location data for the computing device 714, (ii) location information correlated with WiFi network coordinates for WiFi networks detected by the computing device 714, (iii) location information correlated with cellular network coordinates of cell tower signals detected by the computing device 714, and/or (iv) location information based on receipt of an ultrasonic audio signal emitted by one or more of PBD 702 and/or PBD 704.

Additionally, or alternatively, the indication may include a confirmation that the computing device 714 is connected to one or more of PBD 702 and/or PBD 704 via LAN 716, or even a confirmation that the computing device 714 is within area 708. In some embodiments, the computing device 714 is additionally or alternatively configured to estimate a distance been the computing device 714 and each of the playback devices in the media playback system. The distance estimate between the computing device 714 and an individual playback device may be based at least in part on one or more of: (i) an audio signal received from the playback device, and/or (ii) a signal strength of an RF signal (e.g., WiFi, Bluetooth, RFID, NFC) emitted by the playback device.

In some embodiments, one or more of the PBDs 702-706 additionally or alternatively sends one or more of the above-listed indications to the server 722. For example, in some embodiments, one or more of the PBDs 702-706 are configured with one or more of (i) a camera or optical reader for capturing photographs or reading optical codes, (ii) an RFID detector/reader for reading RFID tags, (iii) a WiFi transceiver for receiving WiFi transmissions, and/or (iv) an NFC reader for reading NFC tags. In such embodiments, if multiple playback devices detect or receive an RF transmission or audio signal emitted from the physical item 712, the playback devices can determine which of the playback devices is closer (or closest) to the physical item 712 based at least in part on a comparison of received signal strengths at each playback device that detected or received the RF transmission or audio signal.

After receiving one or more of the above-described indications from one or more of the computing device 714 and/or playback devices (e.g., PBDs 702-706), the server (e.g., 722) individually or in combination with one or more other servers (e.g., 720, 740) and/or other computing systems (not shown) determines that the physical item 712 is within an area comprising one of the playback devices, e.g., area 708 comprising PBDs 702 and 704.

In some embodiments, an individual playback device may determine that the physical item 712 is present in an area comprising the playback device. In such embodiments, the playback device may make the determination individually or in combination with one or more other playback devices, computing devices, and/or servers. For example, PBD 704 may determine that physical item 712 is present in area 708 comprising PBD 704 and PBD 702.

For example, in some embodiments, as described above, one or more of the PBDs 702-706 are configured with one or more of (i) a camera or optical reader for capturing photographs or reading optical codes, (ii) an RFID detector/reader for reading RFID tags, (iii) a WiFi transceiver for receiving WiFi transmissions, and/or (iv) an NFC reader for reading NFC tags. In such embodiments, depending on the attributes and capabilities of the physical item 712, a playback device (individually or in combination with one or more other playback devices and/or one or more servers) can detect whether the physical item 712 is within an area comprising one or more playback devices.

In some embodiments, in response to receiving one or more of the above-described indications (e.g., an indication of (i) a photo of the item, (ii) an optical code associated with the item, and/or (iii) an RF signal received from the item), one or more of the servers (e.g., servers 720-724) may transmit information to a playback device that the playback device in turn uses to pair the physical item 712 with the playback device.

C. Detecting a Multi-Part Item in the Area

In some embodiments, the physical item 712 comprises multiple parts or components. In one example, a LEGO® kit has multiple bricks, blocks, and/or other components that form the physical item 712 when those multiple bricks, blocks, and/or other components are arranged in a specific manner. In some embodiments, the multiple parts must be arranged in a specific manner to form an optical code that identifies the physical item 712. In some embodiments, the multiple parts must be arranged in a specific manner to complete a circuit that enables operation of a signal transmitter, such as an RF transmitter, an audio transmitter, an RFID tag, and/or an NFC tag. Once the optical code is completed and/or the signal transmitter is operational, the multi-part item can be detected according to one or more of the item-detection processes described herein.

In some embodiments, determining that the item 712 is present within the area 708 comprising PBD 704 and PBD 702 comprises one or more of the servers 720-724 receiving at least one indication that the multiple components of the item 712 are arranged in the specific manner. In operation, the one or more servers 720-724 receive the at least one indication from one or more of the computing device 714 and/or one or more of PBDs 702-706. In some embodiments, the indication includes one or more of (i) an indication that a camera (at the computing device 714 or one of the PBDs 702-706) has captured an image of the optical code formed from the specific arrangement of the multiple components; (ii) an indication that an RF receiver (at the computing device 714 or one of the PBDs 702-706) has received an RF transmission emitted from an RF transmitter comprising at least one circuit formed from at least a portion of the specific arrangement of components; and/or (iii) an indication that a microphone (at the computing device 714 or one of the PBDs 702-706) has received an audio signal (e.g., an ultrasonic audio signal) emitted by a speaker comprising at least one circuit formed from at least a portion of the specific arrangement of components.

Similarly, in some embodiments, a playback device (individually or in combination with one or more other playback devices, one or more servers, and/or one or more computing devices) determines that the item is within an area comprising the playback device in response to receiving one or more of: (i) an RF transmission (e.g., WiFi, Bluetooth, RFID, NFC, or other suitable transmission) emitted from an RF transmitter comprising at least one circuit formed from at least a portion of the specific arrangement of components, wherein the RF transmission is associated with the multiple components arranged in the specific manner; or (iii) an audio signal (e.g., an ultrasonic audio signal) emitted by a speaker comprising at least one circuit formed from at least a portion of the specific arrangement of components, wherein the audio signal is associated with the multiple components arranged in the specific manner.

Figure 8:
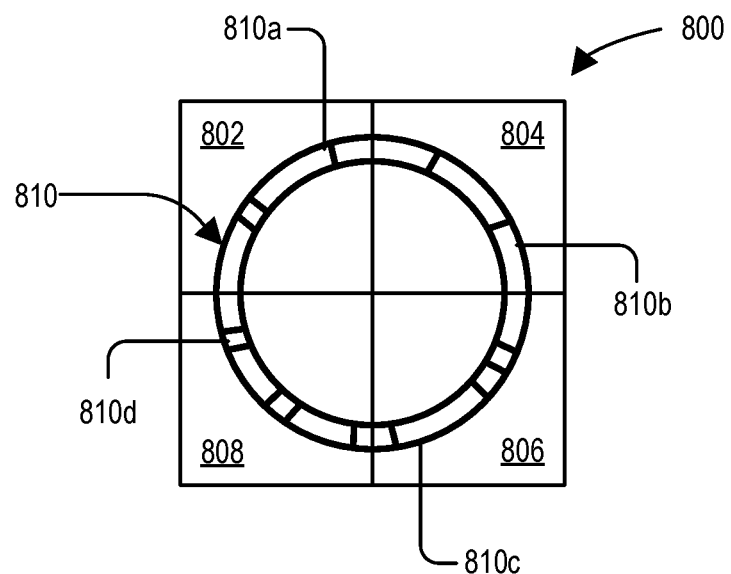
FIG. 8 shows an example of an item formed from multiple components arranged in a specific manner according to some embodiments.

FIG. 8 shows an example of an item 800 formed from multiple components arranged in a specific manner according to some embodiments. Example item 800 is formed from four separate pieces 802-808. In some embodiments, a multi-part item like item 800 may include more or fewer than four separate pieces. In some embodiments, each of the pieces 802-808 may be a LEGO® brick or similar component.

In example item 800, each piece has a portion of an optical code 810 appearing on its outer surface that can be read by a camera or optical code reader on a computing device, such as computing device 714 (FIG. 7), and/or a playback device such as PBDs 702-706 (FIG. 7). In particular, the first piece 802 has a first portion 810a of the optical code 810, the second piece 804 has a second portion 810b of the optical code 810, the third piece 806 has a third portion 810c of the optical code 810, and the fourth piece 808 has a fourth portion 810d of the optical code 810. When all four pieces 802-808 are arranged and combined in the specific manner shown in FIG. 8, the combination of pieces displays an optical code 810 that can be read by a camera and/or optical code reader.

But if the four pieces 802-808 are arranged in a different manner than what is shown in FIG. 8, then the combination of pieces will not display the completed optical code 810. For example, if the first piece 802 and the second piece 804 switched places, the combination of pieces would not form the circular optical code 810 correctly.

Figure 9:
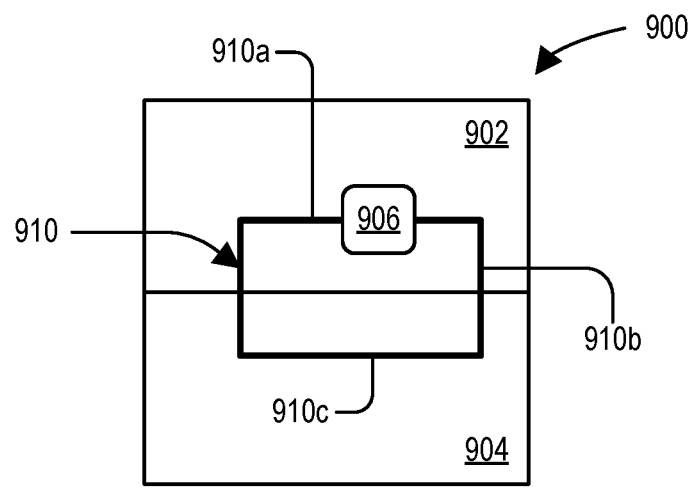
FIG. 9 shows an example of an item formed from multiple components arranged in a specific manner according to some embodiments.

FIG. 9 shows another example of a multi-part item 900 formed from multiple components arranged in a specific manner according to some embodiments.

Example item 900 is formed from two separate pieces 902 and 904. In some embodiments, a multi-part item may include more or fewer than two separate pieces. In some embodiments, each of the pieces 902-904 may be a LEGO® brick or similar component.

In example 900, each piece encloses a portion of a circuit 910 that, when completed, enables a signal transmitter 906 to transmit a signal. In some embodiments, the signal is an RF signal, e.g., an RFID signal, NFC signal, Bluetooth signal, or WiFi signal. In some embodiments, the signal is an audio signal, such as an ultrasonic audio signal.

In some embodiments, the separate pieces may fit together in a 2-D or 3-D jigsaw puzzle manner to guide placement of the pieces. In some embodiments, completion of the circuit additionally or alternatively activates one or more of a processor, network interface, a speaker, a power source, a pairing button, or any other set of electronic components that can be created and/or activated via completion of one or more circuits.

As mentioned previously, each piece encloses a portion of a circuit. In item 900, the first piece 902 includes a signal transmitter 906, a first portion 910*a* of the circuit 910, and a second portion 910*b* of the circuit 910. The second piece 904 includes a third portion 910*c* of the circuit 910. When pieces 902 and 904 are arranged and combined in the specific manner shown in FIG. 9, the combination of pieces completes circuit 910 to enable the transmitter 906 to operate.

But if the pieces 902-904 are arranged in a different manner than what is shown in FIG. 9, then the combination of pieces will not complete the circuit 910. For example, if the first piece 902 and the second piece 904 switched places, the first portion 910*a* and second portion 910*b* would not interface with the third portion 910*c* to complete the circuit 910.

Once the circuit 910 is complete and the signal transmitter 906 is operable, the item 900 can transmit an RF signal (or an audio signal if the signal transmitter 906 is a speaker) which can be detected by an appropriate RF receiver (or a microphone, if the signal transmitter 906 is a speaker) on a computing device, such as computing device 714 (FIG. 7), and/or a playback device such as PBDs 702-706 (FIG. 7).

In some embodiments, completing the circuit 910 causes the signal transmitter 906 to transmit a signal comprising information that causes a playback device (e.g., PBD 702) to perform one or more actions. The actions may include one or more of: (i) forming a synchrony group with at least one additional playback device, (ii) forming a synchrony group with at least the item 900, (iii) forming another type of grouping with one or both of another playback device and/or the item 900, (iv) playing media content associated with the item 900, (v) playing media content associated with the item 900 in synchrony with one or more additional playback devices, (vi) playing media content in synchrony with at least the item 900, and/or (vii) playing media content in a coordinated fashion with one or more of another playback device, a computing device 714, and/or the item 900.

In some embodiments, completing the circuit 910 causes the signal transmitter 906 to transmit a signal comprising information that additionally or alternatively causes a computing device (e.g., computing device 714) to perform one or more actions. The actions may include one or more of: (i) launching a graphical user interface associated with the item 900, (ii) navigating a graphical user interface associated with the item 900 to a particular page or input prompt, (iii) play media content associated with the item 900, (iv) forming a synchrony group or another type of grouping with one or more playback devices, (v) playing media content in a coordinated fashion with one or more of a playback device, another computing device 714, and/or the item 900.

In some embodiments, a toy may comprise many items and/or multi-part items. For example, a LEGO® kit may have many hundreds or even thousands of pieces. Constructing the LEGO® kit may involve multiple items, including multi-part items like item 800 and/or item 900.

For example, the box that the LEGO® kit was packaged in or an instruction booklet included with the LEGO® kit may include an optical code. Scanning the optical code may directly or indirectly cause one or more playback devices to start playing media content associated with the scanned code. In one example, the LEGO® kit is a Batman® kit. Computing device 714 (e.g., a smartphone, tablet, smartwatch, etc.) scans a code on the box or the instruction booklet included with the kit and sends the scanned code to one or more of the servers 720-724 for identification, perhaps along with an indication of which playback device the computing device 714 is closest to, as described above.

After identifying the code, one or more of the servers 720-724 obtains media content associated with the code. In one example, server 720 generates a cloud queue 726 comprising network links to the media content, and PBD 702 stores a portion of the cloud queue 726 in its local memory, as described further below.

Identifying the code triggers the playback devices to start playing Batman® theme music, for example, from a Batman® television show, movie, or cartoon. After playing the theme music, the playback devices may begin playing ambient background sounds associated with the LEGO® kit. For example, the ambient background sounds might include background city sounds for Gotham, the fictional city where Batman fights crime, along with other intermittent Batman®-themed sounds. In some embodiments, the media content comprises a playlist of Batman®-themed content.

Building the kit may require completing certain multi-part items like item 800 with scannable optical codes and/or item 900 that transmit RF or audio signals. While PBD 702 and PBD 704 are playing the ambient background sounds, detection of subsequent optical codes and/or detection of subsequent RF or audio signals trigger playback of additional media content, some of which may already be queued for playback in the portion of the cloud queue 726 stored in local memory at the playback device, and some of which may need to be obtained via one or more of (i) downloads of subsequent portions of the cloud queue from the one or more servers 720-724, (ii) downloads of other media content from network locations separate from the one or more servers 720-724, and/or (iii) transfers of media content from one or both of an item 712 and/or the computing device 714 to one or more of PBD 702 and/or PBD 704.

For example, completing a portion of the kit may trigger transmission of an RF or audio signal that causes PBD 702 and/or PBD 704 (and/or perhaps computing device 714) to play a congratulatory message or a congratulatory sound. In operation, PBD 702 and/or PBD 704 may mix the congratulatory message or sound with the currently-playing ambient background sounds and/or music, and then play the mixed (i.e., combined) content.

In some embodiments, the ambient background sounds and/or music may change upon completing a portion of the kit that triggers transmission of an RF or audio signal. For example, if the kit includes a Batman® vehicle and a Joker® vehicle, snapping together the first two bricks of the Joker® vehicle may trigger playback of different ambient background sounds and/or music associated with the Joker® character.

And in some embodiments, the ambient background sounds and/or music may change upon completing the whole kit. For example, snapping together the last two bricks of the LEGO® kit may trigger transmission of an RF or audio signal that causes one or more of (i) a congratulatory message, sound, or confirmation, (ii) a change in the background ambient sounds or music, and/or (iii) loading of sound effects into local storage of one or more (or all) the playback devices for quick playback upon detection of a button/trigger mechanism, as described in further detail herein.

D. Obtaining and Playing Media Content in Response to Detecting an Item in the Area As described above, in some embodiments, one or more of the servers 720-724, individually or in combination with the computing device 714 and/or one or more PBDs 702-706, determines whether the physical item 712 (including a multi-part item) is within an area comprising one or more of the PBDs 702-706 based at least in part on one or more of the above-described indications received from one or more computing devices and/or PBDs. And in other embodiments, one or more of the PBDs 702-706, individually or in combination with the computing device 714 and/or one or more of the servers 720-724, determines whether the physical item 712 (including a multi-part item) is within an area comprising one or more of the PBDs 702-706 based on (or perhaps in response to) receiving at least one of an RF or audio signal from the item 712. In still further embodiments, the computing device 714, individually or in combination with one or more of the PBDs 702-706 and/or servers 720-724, determines whether the physical item 712 is within an area comprising one or more of the PBDs 702-706.

Regardless of which of the servers 720-724, PBDs 702-706, and/or computing device 714 ultimately determines that the physical item 712 is within an area comprising one or more of the PBDs 702-706, after making the determination, one or more of the PBDs in the determined area plays media content corresponding to the physical item 712. For example, in response to determining that physical item 712 is in area 708 comprising PBD 702 and PBD 704 at time t=1, one or more both of PBD 702 and/or PBD 704 play media content associated with the physical item 712.

In some embodiments, one or more of the servers 720-724 cause one or more of the playback devices to play the media content associated with the physical item 712. For example, in response to determining that the physical item 712 is within area 708 comprising PBD 702 and 706 at time t=1, one or more of servers 720-724 cause one or more of PBDs 702 and 704 to play the media content.

In operation, and as mentioned above, the physical item 712 has media content associated with it. For example, if the physical item 712 is a Batman® toy, the media content associated with the physical item 712 may include media that is relevant to the toy, such as (i) Batman music or soundtracks from Batman TV shows, cartoons, or movies, (ii) video clips from Batman TV shows, cartoons, or movies, (iii) Batman sound effects or ambient Batman sounds, (iv) Batman video effects, such as backgrounds, colors, imagery, iconography, or other Batman or Batman-related themes.

In some embodiments, the media content may have been specially created for the particular toy, for example, as part of a playset, story, or theme for the particular toy. For example, if the playset is a LEGO® playset with LEGO® dinosaurs, the media content may include, for example, an ambient Jurassic jungle soundscape complete with intermittent rainstorms, insects, dinosaur walking sounds, and dinosaurs roaring in the distance, and possibly dinosaur sounds to be played by a dinosaur toy (or perhaps in response to activating a trigger on the dinosaur toy). In another example, the playset may include a storybook and a doll or action figure, and the media content may include, for example, a narration of the story for playback by a playback device, and dialog to be played by the doll or action fiction figure (or perhaps in response to activating a trigger on the doll or action figure).

In some embodiments, in response to determining that the item 712 is present within the area 708 comprising PBD 702 and 704, one or more of the servers 720-724 instruct or otherwise cause one or more of PBD 702 and/or PBD 704 to play media content corresponding to the item 712.

In some embodiments, the one or more servers instructing and/or causing a playback device to play media content corresponding to the item includes: (i) one of the one or more servers obtaining the media content corresponding to the item from a network location (e.g., a media library and/or a media streaming service), and (ii) transmitting the media content corresponding to the item to the playback device. In some embodiments, the network location is separate from the one or more servers. In one example, server 722 obtains media content from a network location and transmits the media content to PBD 702. And PBD 702 in turn transmits at least a portion of the media content to PBD 704 and plays the media content individually or in synchrony with PBD 704, or perhaps in a coordinated fashion with PBD 704.

In some embodiments, the one or more servers instructing and/or causing a playback device to play media content corresponding to the item includes instructing and/or causing the playback device to obtain the media content corresponding to the item from a network location (e.g., a media library and/or a media streaming service). In some embodiments, the network location is separate from the one or more servers. In one example, server 722 instructs PBD 702 to obtain media content from a network location. And PBD 702 in turn (i) obtains the media content from the network storage location, (ii) transmits at least a portion of the media content to PBD 704 and (iii) plays the media content individually or in synchrony with PBD 704, or perhaps in a coordinated fashion with PBD 704.

In further embodiments, the one or more servers instructing and/or causing a playback device to play media content corresponding to the item includes at least one of the servers creating a cloud queue comprising network links (e.g., URI or URL) to the media content. In some embodiments, at least a portion of the cloud queue comprising the network link(s) to the media content is copied to a local queue on the playback device.

In one example, server 720 creates a cloud queue 726. The cloud queue 726 includes one or more network links to media content associated with the item 712 that was previously detected. The server 720 transmits at least a portion of the cloud queue 726 comprising the one or more network links to the media content associated with the item 712 to one or both of PBD 702 and/or PBD 704. In some embodiments, the server 720 additionally or alternative transmits a portion of the cloud queue 726 comprising the one or more network links to the media content associated with the item 712 to the computing device 714 and/or the item 712. In some embodiments, the server 720 transmits the portion of the cloud queue 726 comprising the one or more network links to the media content associated with the item 712 to one or more of PBD 702, PBD 704, computing device 714, and/or the item 712 in response to a request received from at least one of PBD 702, PBD 704, computing device 714, and/or the item 712.

In some embodiments, after a playback device receives the portion of the cloud queue 726 comprising the one or more network links to the media content associated with the item 712, the playback device stores the received portion of the cloud queue in a local queue stored on the playback device. In some embodiment, the playback device plays back content the local queue, which includes at least a portion of the cloud queue, by using the network links within the local queue (including the network links in the portions of the cloud queue copied to the local queue) to stream media content from the network locations corresponding to the network links.

As described above, in one example, the item 712 is a toy, playset, game, game piece, etc., from a particular toy/game manufacturer. In response to detecting the item 712 in area 708, server 720 (a Sonos server in this example) generates the cloud queue 726 and populates the cloud queue 726 with network links to media content (or perhaps the actual content) obtained from server 724 (e.g., a server operated by the toy/game manufacturer). In some embodiments, the media content includes one or more individual music tracks, sound effects, ambient sounds, and/or a playlist of music tracks, many of which have been developed and/or curated by or on behalf of the toy/game manufacturer for playback while building, playing with, and/or otherwise interacting with the item 712. The server 720 (a Sonos server) transmits at least a portion (or perhaps all) of the cloud queue 726 to one or more devices. For example, in some embodiments, the server 720 transmits the portion(s) of the cloud queue 726 to PBD 702, which in turn stores the received portion(s) in a local queue in PBD 702's local memory. PBD 702 can then use information in the locally-stored portion(s) of the cloud queue (e.g., links to media content and/or copies of the media content) to play the media content associated with the item 712.

In a different example, in response to detecting the item 712 in area 708, server 724 (a Sonos server in this example) signals server 720 (e.g., a server operated by the toy/game manufacturer) that the item 712 has been detected. In response, server 720 (the toy/game manufacturer's server) generates the cloud queue 726 and populates the cloud queue 726 with network links to media content (or perhaps the actual content). The content may be stored at server 720 (the toy/game manufacturer's server) or perhaps another server (e.g., server 722) at some other network location, and perhaps operated by another entity. As with the earlier-described embodiments, the media content includes one or more individual music tracks, sound effects, ambient sounds, radio station, and/or a playlist of music tracks, many of which have been developed and/or curated by or on behalf of the toy/game manufacturer for playback while building, playing with, and/or otherwise interacting with the item 712. The server 720 (the toy/game manufacturer's server) transmits at least a portion (or perhaps all) of the cloud queue 726 to one or more devices.

In some embodiments, after generating the cloud queue 726, the server 720 (the toy/game manufacturer's server) transmits one or more portions of the cloud queue 726 to PBD 702, which in turn stores the received portion(s) in a local queue in PBD 702's local memory. In some embodiments, the server 720 additionally or alternatively transmits one or more portions of the cloud queue 726 to one or more of computing device 714 and/or item 712, each of which in turn stores the received portion in its respective local memory.

After receiving a portion (or portions) of the cloud queue 726, one or more of PBD 702, PBD 704, computing device 714, and/or item 712 may play the media content. In some embodiments, one or more of PBD 702, PBD 704, computing device 714, and/or item 712 play the media content in synchrony with each other. In some embodiments, one or more of PBD 702, PBD 704, computing device 714, and/or item 712 play different portions of media content in a coordinated fashion with each other, e.g., PBD's 702 and 704 may play ambient background sounds, the item 712 may play certain sound effects, and the computing device 714 may play other sound effects or dialog.

In another example, the server 720 (the toy/game manufacturer's server) transmits at least a portion (or perhaps all) of the cloud queue 726 to server 724 (the Sonos server). And after receiving one or more portions of the cloud queue 726, server 724 transmits the portion(s) to one or more devices.

In yet another example, one of the servers 720-724 transmits at least a portion of the cloud queue 726 to a single device, e.g., PBD 702, PBD 704, computing device 714, or item 712. The device that received the portion(s) of the cloud queue 726 stores the received portion(s) in local memory. For example, if PBD 702 receives the portion(s) of the cloud queue 726, then PBD 702 stores the received portion(s) of the cloud queue 726 in local memory, for example, by adding the receive portion(s) of the cloud queue 726 to PBD 702's local playback queue. After storing the received portion(s) in local memory, the receiving device uses the network links in the received portion(s) of the cloud queue 726 to obtain media content and coordinate playback of the media content with one or more additional devices. For example, after receiving and storing portions of the cloud queue 726 in its local playback queue, PBD 702 may use the information in the locally-stored portion(s) of the cloud queue 726 to obtain the media content. And after obtaining the media content, PBD 702 streams at least some of the media content via the LAN 716 to one or more of PBD 704, PBD 706, computing device 714, and/or item 712 for synchronous and/or coordinated playback.

In some embodiments, PBD 702 may stream portions of the media content to different devices via different transmission protocols. For example, PBD 702 may stream portions of media content via the LAN 712 to PBD 704 for synchronous playback with PBD 702. And PBD 702 may stream portions of media content to item 712 via Bluetooth for coordinated (or perhaps synchronous) playback with PBD 702 and PBD 704. For example, PBD 702 and PBD 704 may play ambient background sounds and/or audio tracks (received via LAN 716) in synchrony with each other while item 712 plays sound effects (received via a Bluetooth link).

Regardless of the transmission protocol(s) or network infrastructure used to distribute the media content to and/or between the one or more devices, after receiving respective media content, the devices then play the media content. Some devices may play portions of the media content in synchrony with each other and some devices may play portions of the media content in a coordinated fashion with each other.

For example, the media content may include audio tracks, sound effects, video effects, and/or ambient background music. In some embodiments, the media content may even include user-generated audio or video content that the user has associated with the item. Different devices may play different portions of the media content in synchrony and/or in a coordinated fashion. For example, PBD 702 and PBD 704 may play an audio track and/or ambient background music while the item 712 plays sound effects and a video display device (not shown) plays video effects. In operation, playback of the video effects may be coordinated with playback of the sound effects, thereby resulting in an immersive audio and video experience.

In one example, the item 712 may include a microphone and/or camera configured to record audio and/or video of a user interacting with the item 712 for later playback, including later playback while the user (or perhaps another user) is interacting with the item 712. In some embodiments, the item 712 stores the recorded audio and/or video for future playback in response to certain triggering events, such as actuation of one or more button/trigger mechanisms, as described herein. In some embodiments, the item 712 may additionally or alternatively transmit at least a portion of the recorded audio and/or video to one or more of a server (e.g., any of servers 720-724), a playback device (e.g., any of PBDs 702-706), and/or a computing device (e.g., computing device 714). Some embodiments may further include adding the recorded audio/video to a playlist or other set of media content corresponding to the item 712, which may be included in a cloud queue at a server (e.g., cloud queue 726 at server 720), local queue on playback device (e.g., any of PBDs 702-706), and/or portions of a cloud queue stored in a local queue on one or more playback devices.

Some examples may additionally or alternatively include one or both of a playback device (e.g., any of PBDs 702-706) or a computing device (e.g., computing device 714) audio and/or video of a user interacting with the item 712 for later playback, including later playback while the user (or perhaps another user) is interacting with the item 712. The playback device and/or computing device may additionally or alternatively transmit and/or save the recorded audio and/or video to a playlist of media content associated with the item 712. Some embodiments additionally or alternatively include adding the audio/video recorded by the playback device and/or computing device to a playlist or other set of media content corresponding to the item 712, which may be included in a cloud queue at a server (e.g., cloud queue 726 at server 720), local queue on playback device (e.g., any of PBDs 702-706), and/or portions of a cloud queue stored in a local queue on one or more playback devices.

In some embodiments, the item 712 may trigger playback of a sound effect even though the item 712 itself may not play back the sound effect. In one example, the item 712 may be formed from multiple pieces, e.g., item 900 (FIG. 9). Once constructed, the item 900 may include a button or other triggering mechanism that, when activated, sends an RF signal (via Bluetooth, WiFi, RFID, and/or NFC) to one or more of the computing device 714, PBD 702, PBD 704, and/or a video device (not shown). In one example, the PBD 702 detects an RF signal generated by item 712 in response to activation of item 712's button/trigger mechanism. After receiving the RF signal, PBD 702 obtains a sound effect corresponding to the button/trigger activation and plays the sound effect individually or in combination with PBD 704. In some embodiments, the sound effect may be stored in PBD 702's local memory for quick access.

In some embodiments, the sound effect may have a corresponding video effect. In such embodiments, PBD 702 may additionally signal a video display (not shown) to play the corresponding video effect in synchrony with playback of the sound effect by PBD 702 and PBD 704.

In some embodiments, one or both of PBD 702 and/or PBD 704 play multiple portions of the media content at the same time by mixing the multiple portions of content and playing the mixed portions. For example, the PBD 702 may receive/detect an RF signal generated by item 712 in response to activation of the item 712's button/trigger mechanism while PBD 702 and PBD 704 are playing ambient background sounds associated with the item 712 in synchrony with each other. After receiving/detecting the RF signal, PBD 702 obtains a sound effect corresponding to the button/trigger activation. PBD 702 may obtain (or may have previously obtained) the sound effect from any of PBD 702's local memory, one of the servers 720-724, the computing device 714, and/or the item 712. Regardless of how or from where PBD 702 obtains (or has obtained) the sound effect, PBD 702 plays the sound effect individually or in combination with PBD 704. In operation, PBD 702 mixes the sound effect with the ambient background sounds already being played, and then plays the mix of the sound effect and the ambient background sounds individually or in synchrony (or at least in a coordinated fashion) with PBD 704.

In some embodiments, PBD 702 generates the mix of the sound effect and the ambient background sounds and streams the mix to PBD 704 for playback in synchrony (or at least in a coordinated fashion) with PBD 702. In some embodiments, PBD 704 may have a locally-stored copy of the sound effect, in which case, PBD 702 can instruct PBD 704 when to play the sound effect. And at the instructed time, PBD 702 mixes the sound effect with the currently-playing ambient background sounds and plays the mixed signal, and PBD 704 mixes the sound effect with the currently-playing ambient background sounds and plays the mixed signal, thereby resulting in PBD 702 and PBD 704 playing the mix of the sound effect and the ambient background sound in synchrony with each other.

In some embodiments, the sound effect and the ambient background sound can be mixed at different levels. For example, the sound effect can be mixed with the ambient background sound at a lower audio volume level than the ambient background sound to make the sound effect sound far away, and the sound effect can be mixed with ambient background sound at a higher audio volume level than the ambient background sound to make the sound effect sound closer. In operation, each playback device can mix the sound effect with the ambient background sound an audio volume level based at least in part on the position of the item 712 relative to each playback device.

Some embodiments where the item 712 has a speaker capability include adding the item 712 to a synchrony group (or other grouped playback configuration) comprising one or more playback devices. For example, determining that item 712 is within area 708 may additionally trigger item 712 to join a group with PBD 702 and 704. Once in the group with PBD 702 and PBD 704, one or both of PBD 702 and/or PBD 704 controls playback of media content by item 712. In some embodiments, determining that item 712 is within area 708 may additionally or alternatively trigger computing device 714 to join a group with PBD 702 and PBD 704. And once in the group with PBD 702 and PBD 704, one or both of PBD 702 and/or PBD 704 additionally or alternatively controls playback of media content by computing device 714.

E. Playing Media Content in Response to an Item Changing Position or Orientation As described above, in some embodiments, one or more of the servers 720-724, PBDs 702-706, and the computing device 714, individually or in combination with each other, determine whether a physical item 712 (including a multi-part item) is within an area comprising one or more playback devices, e.g., area 708 comprising PBD 702 and PBD 704, and/or area 710 comprising PBD 702 and PBD 706. In FIG. 7, area 708 overlaps area 710, but in other examples, areas may not overlap.

In some embodiments, the item 712 periodically emits an RF signal and/or an audio signal than enables one or more of the playback devices and/or computing device 714 to determine that the item 712 has moved from one area into another area. In some embodiments, actuation of a button/trigger mechanism on the item 712 causes the item 712 to transmit the RF and/or audio signal, as described above.

In operation, and with reference to FIG. 7, determining that the item 712 has moved from area 708 at time t=1, to an overlapping portion of area 708 and area 710 at time t=2, and then to area 710 at time t=3, is substantially the same for each instance of time (t=1, t=2, or t=3).

But in some embodiments, determining that the item 712 is moving from one area to another area triggers the playback devices in the system to dynamically join and leave synchrony groups (or other grouping states) based on a determined approximate location of the item 712.

For example, in some embodiments, determining that the item 712 is at the approximate position within area 708 at time t=1 causes PBD 702 and PBD 704 to join into a synchrony group (or other group playback configuration), if PBD 702 and PBD 704 were not already configured in such a group. Determining that item 712 has moved to the approximate position between area 708 and area 710 at time t=2 causes PBD 706 to join the group configuration with PBD 702 and PBD 704. And determining that item 712 has moved to the approximate position within area 710 at time t=3 causes PBD 704 to leave the group configuration created at time t=2, thereby resulting in a group configuration with PBD 702 and PBD 706 at time t=3. The transition of the playback group from PBDs 702 and 704 at time t=1, to PBDs 702-706 at time t=2, and then to PBDs 702 and 706 at time t=3 is just one illustrative example.

In some embodiments, transitioning between the groupings additionally includes controlling playback volume of certain media content associated with the item 712. For example, at time t=1, PBD 702 and PBD 704 may both be configured to play media content associated with item 712 at a first volume level. A time t=2, PBD 706 may join the playback group at a second volume level that is lower than the first volume level, and PBD 704 may reduce its playback volume from the first volume level to the second volume level such that, at time t=2, PBD 702 is configured to play media content associated with the item 712 at the higher, first volume level, and PBD 704 and PBD 706 are configured to play media content associated with the item 712 at the lower, second volume level. Then, at time t=3, when PBD 704 leaves the playback grouping, PBD 706 may increase its volume from the lower, second volume level to the higher, first volume level such that, at time t=3, PBD 702 and PBD 706 are both configured to play media content associated with item 712 at the first volume level.

The above example uses two volume levels that change when playback devices leave or join playback groupings. However, other embodiments may use multiple levels to more gradually increase or decrease playback volume as the item is moved closer to or further from individual playback devices.

In some embodiments, the playback grouping is a temporary grouping that applies only to playback of media content corresponding to the item 712. In such embodiments, the grouping is a content-specific grouping. This content-specific grouping capability enables the media content to follow the item 712 throughout a house, for example.

In some embodiments, the playback grouping applies only to playback of certain portions of the media content corresponding to the item 712. In one example, PBDs 702-706 may all play the above-described ambient background sounds at the same or substantially the same volume level, but the PBDs 702-706 may play sound effects corresponding to one or more button/trigger activations at different volume levels based on how close the item 712 is or how far the item 712 is from each individual playback device when the butter/trigger actuation is detected.

In addition to altering playback volumes based on the position of the item 712 and how the position of the item 712 changes over time as described above, some embodiments additionally or alternatively include different playback devices playing different media content and/or different channels or components of the same media content based on the orientation of the item 712.

In one example, the item is a gameboard laid out in area 708. The gameboard has associated media content that includes a left channel and a right channel of content. If the gameboard is positioned in area 708 such that PBD 704 is to the left of the gameboard and PBD 702 is to the right of the game board, then PBD 704 plays the left channel of media content and PBD 702 plays the right channel of media content. But if the gameboard is positioned in area 708 such that PBD 704 is to the right of the gameboard and PBD 702 is to the left of the game board, then PBD 704 plays the right channel of media content and PBD 702 plays the left channel of media content.

In operation, the orientation of a gameboard or other item can be determined in multiple ways. For example, a camera can capture the orientation and send an indication of the orientation to one or more servers for determination. In another example, one or more RFID and/or NFC readers detects two or more RFID and/or NFC transmissions from two or more tags embedded within two or more respective corners of the gameboard or other item. The orientation of the gameboard or other item can then be determined based on comparing signal receive levels of the two or more different transmissions.

Other another example, the gameboard or other item has an inertial measurement unit (IMU) that determines a position and orientation of the item 712. An indication of the position and orientation can be sent to one or more of the computing device 14, PBDs 702-706, and/or servers 720-724.

F. Playing Media Content in Response to Presence of Virtual Item

The previous examples illustrated features and functions relating to determining whether a physical item is present within an area comprising a playback device, and in response to determining that the physical item is present within the area comprising the playback device, playing media content associated with the physical item via the playback device. Similar features and functions are applicable to virtual items, such as virtual items that exist within an augmented reality space.

Some embodiments include determining whether a virtual item is present within an augmented reality space at least partially coextensive with an area comprising a location of the first playback device, wherein the virtual item has corresponding media content associated therewith, wherein the media content comprises first content and second content, and wherein the media content comprises one or both of audio content or video content. And in response to determining that the virtual item is present within the augmented reality space at least partially coextensive with the area comprising the location of the first playback device, the playback device plays the first content corresponding to the virtual item.

In some embodiments, the media playback system enables the physical item 712 to interact with the virtual item within an area comprising a playback device, where the interactions between the virtual item and the physical item are indicated by sound effects and/or other audio indications played by the playback device.

In some embodiments, determining that the virtual item is present within the augmented reality space at least partially coextensive with the area comprising the location of the first playback device includes (i) receiving an approximate physical position corresponding to the virtual position of the virtual item within the augmented reality space, and (ii)

determining that the virtual item is present within the augmented reality space at least partially coextensive with the area comprising the location of the playback device when the approximate physical position corresponding to the virtual position within the augmented reality space is within the area comprising the location of the first playback device.

In operation, playing back media content associated with the virtual item based on the virtual position of the virtual item is the same as or similar to playing back media content associated with the physical item based on the physical position of the physical item. For example, the one or more servers may generate a cloud queue with network links to media content associated with the virtual item. Portions of the cloud queue may be obtained from the one or more servers and stored in local memory at a playback device (and perhaps also implemented in the playback device's local playback queue). And the playback device may steam the media content from the network links within the locally-stored portions of the cloud queue for playback individually or in combination with one or more other playback devices.

In some embodiments, playing media content associated with a virtual item in the manners described herein enables a virtual hide and seek game, as well as other possible games.

For example, a computing device (e.g., computing device 714), individually or in combination with one or more servers (e.g., servers 720-724) renders or otherwise produces, manages, or provides a graphical interface into an augmented reality space. When the virtual hide and seek game is started, the computing device hides the virtual item somewhere within an area comprising one or more playback devices. For example, computing device 714 may hide a virtual item somewhere within area 708 or area 710, and then provide virtual and/or physical coordinates indicating the location of the virtual item to one or more of playback devices 702-706 and/or servers 720-724.

In one example, the virtual item is hidden in area 708. When PBD 704 determines that the virtual item is hidden in area 708, PBD 704 may play media content associated with the virtual item. For example, if the virtual item is a specific virtual creature, PBD 704 may play one or more sounds or sound effects associated with the virtual creature. Based on the physical location corresponding to the virtual location of the virtual item within the augmented reality space, PBD 702 may also play one or more sounds or sound effects associated with the virtual item.

If the virtual item moves from area 708 to area 710 along a path similar to the path in FIG. 7 showing the path of physical item 712 at time t=1, time t=2, and time t=3, the PBDs 704-706 may adjust the volumes that they play the media content associated with the virtual item in a manner similar to the way PBDs 704-706 adjusted their volumes based on the position of physical item 712.

Additionally, in some embodiments, if the virtual item is in area 708 and PBD 706 determines that a person looking for the hidden virtual item is in area 710 based on a signal (e.g., RF or audio) emitted by a computing device associated with the person, or perhaps emitted by physical item 712, then PBD 706 can play different content associated with the virtual item. For example, PBD 706 may play a sound, cue, or other indication that the person should look in a different area for the virtual item. In this manner, PBD 706 determines that the virtual item is not present within the augmented reality space at least partially coextensive with the area 710 comprising the location of the PBD 706, and then plays second content (i.e., cues, clues, or other indications) corresponding to the virtual item.

In embodiments where an area includes multiple playback devices, such as a room equipped with surround sound capabilities, the playback devices, individually or in combination with one or more servers and/or one or more other computing devices, can steer certain sounds and/or sound effects associated with the virtual item to different areas of the room by altering the playback volume and/or playback delay of the sound and/or sound effect associated with the virtual item.

When the virtual item is found, one or more playback devices may play a congratulatory sound or confirmation, or a particular audio track to indicate that the virtual item was located. In some embodiments, the virtual item is deemed found when the physical item 712 is brought to a physical location that corresponds to the virtual location of the virtual item with the augmented reality space.

V. Example Methods

Figure 10:
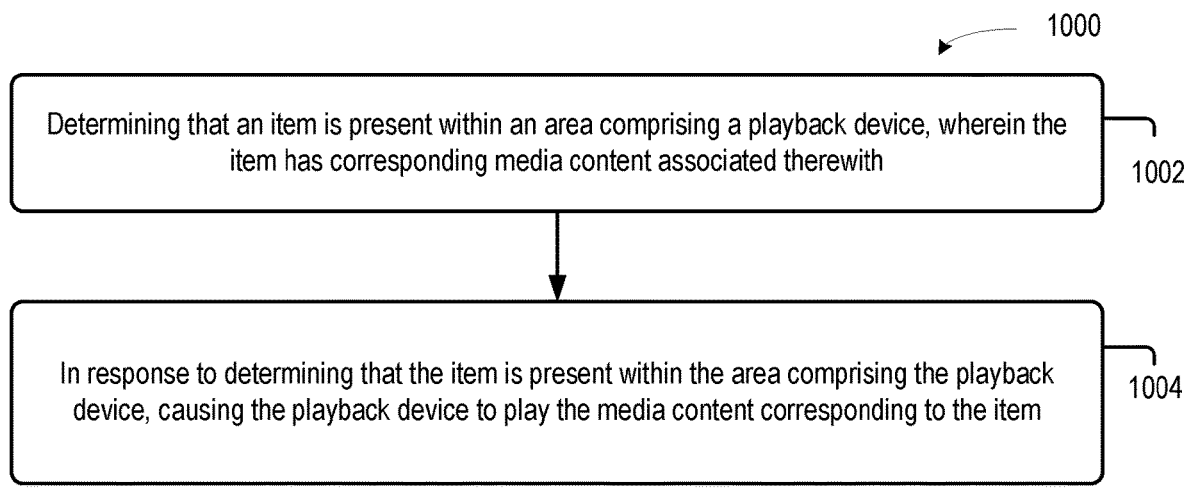
FIG. 10 shows an example method performed by a computing system according to some embodiments.

FIG. 10 shows an example method 1000 performed by a server system, individually or in combination with one or more computing devices and/or playback devices, according to some embodiments. The server system, computing devices, and/or playback devices are similar to or the same as the server system, computing devices, and/or playback devices disclosed herein.

Method 1000 begins at block 1002, which includes determining that an item is present within an area comprising a playback device, wherein the item has corresponding media content associated therewith.

In some embodiments, the media content comprises audio content, video content, any type of media content disclosed and described herein, and/or any other type of media content now known or later developed. In some embodiments, the area comprising the playback device is remote from the server systems. In some embodiments, the item comprises one or more multi-part items similar to or the same as item 800, item 900, and/or any other type of multi-part item comprising one or more of an optical code formed from a specific arrangement of parts, an RF transmitter comprising at least one circuit formed from at least a portion of the specific arrangement of parts, and/or an ultrasonic audio transmitter comprising at least one circuit formed form at least a portion of the specific arrangement of parts. In operation, determining that an item is present within an area comprising the playback device may include any one or more of the item detection methods disclosed and described herein.

Next, method 1000 advances to block 1004, which includes, in response to determining that the item is present within the area comprising the playback device, causing the playback device to play the media content corresponding to the item. In operation, the server system causes the playback device to play the media content corresponding to the item according to any of the methods of causing one or more playback devices to play media content disclosed and described herein.

Figure 11:
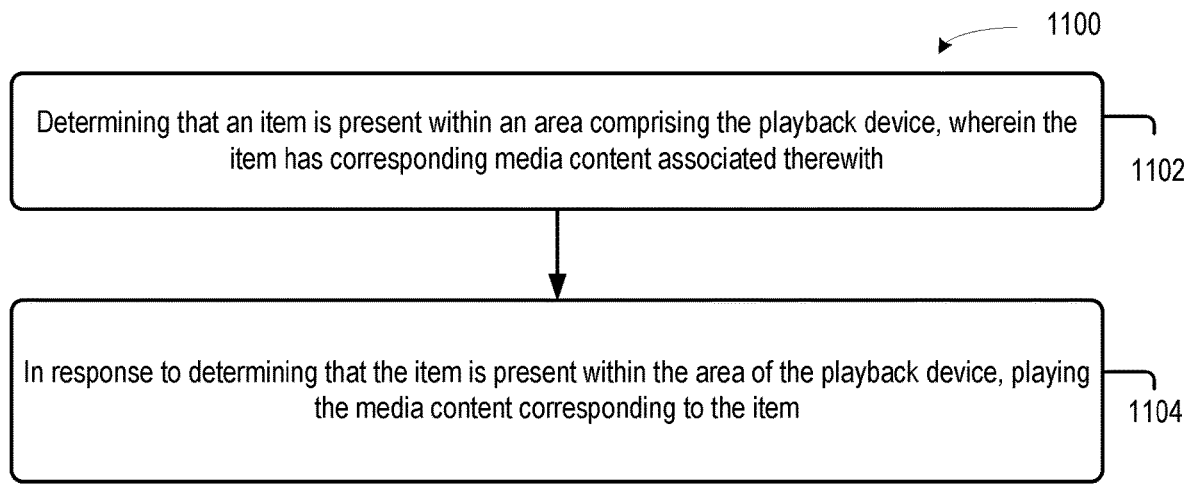
FIG. 11 shows an example method performed by a playback device according to some embodiments.

FIG. 11 shows an example method 1100 performed by a playback device, individually or in combination with one or more computing devices and/or server systems, according to some embodiments. The server system, computing devices, and/or playback devices are similar to or the same as the server system, computing devices, and/or playback devices disclosed herein.

Method 1100 begins at block 1102, which includes one or more playback devices determining that an item is present within an area comprising the playback device, wherein the item has corresponding media content associated therewith.

In some embodiments, the media content comprises audio content, video content, any type of media content disclosed and described herein, and/or any other type of media content now known or later developed. In some embodiments, the item comprises one or more multi-part items similar to or the same as item 800, item 900, and/or any other type of multi-part item comprising one or more of an optical code formed from a specific arrangement of parts, an RF transmitter comprising at least one circuit formed from at least a portion of the specific arrangement of parts, and/or an audio transmitter comprising at least one circuit formed from at least a portion of the specific arrangement of parts. In operation, determining that an item is present within an area comprising the playback device may include any one or more of the item detection methods disclosed and described herein.

Next, method 1100 advances to block 1104, which includes in response to determining that the item is present within the area of the playback device, playing the media content corresponding to the item. In operation, playing the media content corresponding to the item includes playing the media content according to any of the methods of obtaining and playing media content disclosed and described herein.

Figure 12:
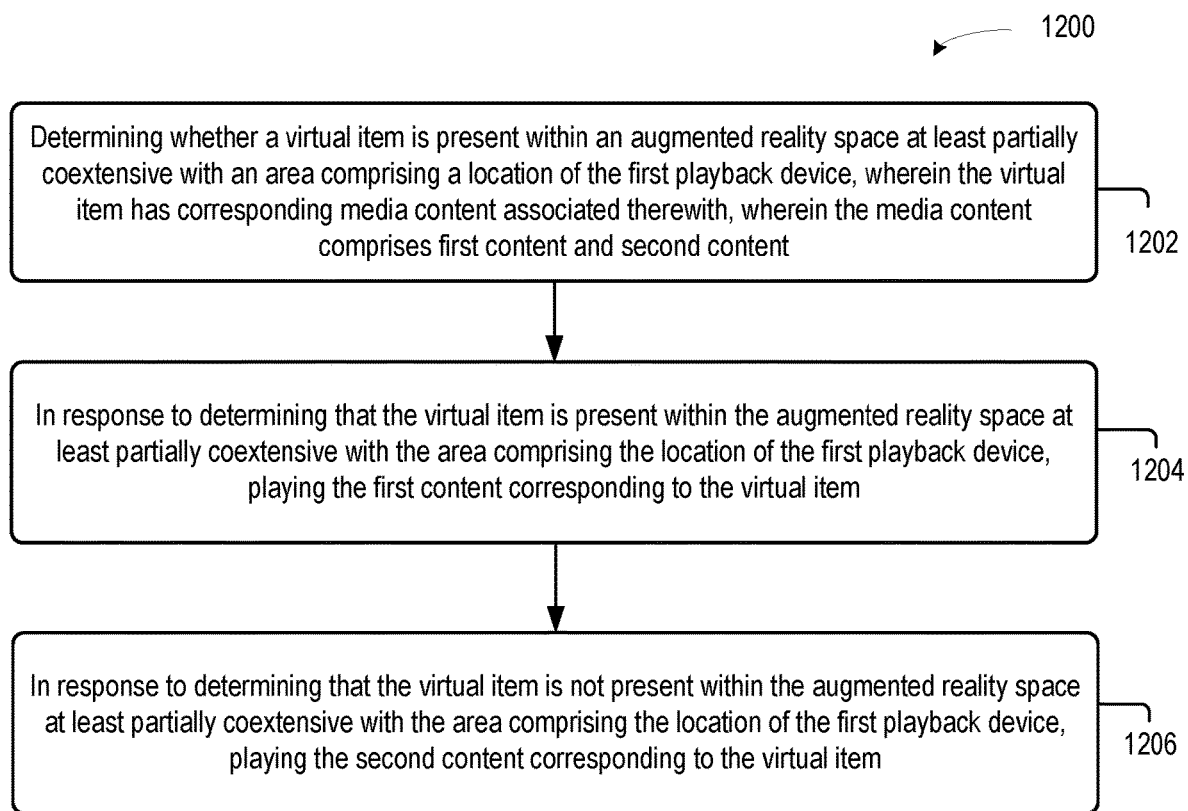
FIG. 12 shows an example method performed by a playback device according to some embodiments.

FIG. 12 shows an example method 1200 performed by a playback device, individually or in combination with one or more computing devices and/or server systems, according to some embodiments. The server system, computing devices, and/or playback devices are similar to or the same as the server system, computing devices, and/or playback devices disclosed herein.

Method 1200 begins at block 1202, which includes determining whether a virtual item is present within an augmented reality space at least partially coextensive with an area comprising a location of the first playback device, wherein the virtual item has corresponding media content associated therewith. In some embodiments, the media content comprises audio content, video content, any type of media content disclosed and described herein, and/or any other type of media content now known or later developed.

In some embodiments, determining whether a virtual item is present within an augmented reality space at least partially coextensive with an area comprising a location of the first playback device includes (i) receiving an approximate physical position corresponding to the virtual position of the virtual item within the augmented reality space, and (ii) determining that the virtual item is present within the augmented reality space at least partially coextensive with the area comprising the location of the playback device when the approximate physical position corresponding to the virtual position within the augmented reality space is within the area comprising the location of the first playback device. For example, a computing device and/or server system rendering and/or generating the augmented reality space may inform the playback device and/or one or more servers associated with the playback device of the virtual position within the augmented reality space and/or a physical position corresponding to the virtual position. In some embodiments, determining whether a virtual item is present within an augmented reality space at least partially coextensive with an area comprising a location of the first playback device includes receiving an indication from a computing device and/or server system rendering and/or generating the augmented reality space that the virtual position within the augmented reality space is within the area comprising the location of the first playback device.

Next, method 1200 advances to block 1204, which includes, in response to determining that the virtual item is present within the augmented reality space at least partially coextensive with the area comprising the location of the first playback device, playing the first content corresponding to the virtual item. In operation, playing the first content corresponding to the item includes playing the first content according to any of the methods of obtaining and playing media content disclosed and described herein.

In some embodiments, playing the first content corresponding to the virtual item includes determining at least one of a virtual orientation or a virtual position of the virtual item within the augmented reality space, and playing the first content corresponding to the virtual item based on the determined virtual orientation or virtual position of the item within the augmented reality space. In some embodiments, determining at least one of a virtual orientation or a virtual position of the virtual item within the augmented reality space includes: (i) receiving an indication of a physical orientation corresponding to the virtual orientation of the virtual item; and/or (ii) receiving an indication of a physical position corresponding to the virtual position of the virtual item.

The first playback device in some embodiments is part of a media playback system that includes the first playback device and a second playback device. In some of these embodiments, playing the media content based on the determined orientation or position of the item relative to the playback device includes sending a second portion of the media content to the second playback device, and playing a first portion of the media content in synchrony with (or perhaps otherwise coordinated with) the second playback device playing the second portion of the media content.

In some embodiments where the first playback device is part of a media playback system that includes the first playback device and the second playback device, determining at least one of a virtual orientation or a virtual position of the virtual item within the augmented reality space includes determining one or more of (i) at least one of a corresponding physical orientation or corresponding physical position of the virtual item relative to the first playback device and (ii) at least one of a corresponding physical orientation or corresponding physical position of the virtual item relative to the second playback device. And in some such embodiments, playing the media content includes playing at least a portion of the media content at a first volume level while the second playback device plays the at least a portion of the media content at a second volume level, wherein the first volume level is based on the corresponding physical orientation or corresponding physical position of the virtual item relative to the first playback device, and wherein the second volume level is based on the corresponding physical orientation or corresponding physical position of the virtual item relative to the second playback device.

In some embodiments, determining at least one of a virtual orientation or a virtual position of the virtual item within the augmented reality space additionally or alternatively includes tracking a corresponding physical orientation or corresponding physical position of the virtual item relative to the first playback device or the second playback device over time. In some such embodiments, playing the media content includes playing at least a portion of the media content based on the corresponding physical orientation or corresponding physical position of the virtual item relative to the first playback device.

Further, in some embodiments, playing at least a portion of the media content based on the corresponding physical orientation or corresponding physical position of the virtual item relative to the first playback device comprises: (i) adjusting playback volume levels of the at least a portion of the media content at the first playback device and the second playback device as the corresponding physical orientation or corresponding physical position of the virtual item changes over time and/or (ii) changing from playing a first portion of the media content to playing one or more of a combination of the first portion or second portion of the media content as the corresponding physical orientation or corresponding physical position of the virtual item changes over time.

Next, method 1200 advances to block 1206, which includes in response to determining that the virtual item is not present within the augmented reality space at least partially coextensive with the area comprising the location of the first playback device, playing the second content corresponding to the virtual item. In operation, playing the second content corresponding to the item includes playing the second content according to any of the methods of obtaining and playing media content disclosed and described herein.

VI. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
   one or more processors; and
   tangible, non-transitory computer-readable media comprising program instructions executable by the one or more processors such that the first playback device is configured to:
   determine whether a virtual item is present within an augmented reality space at least partially coextensive with an area comprising a location of the first playback device, wherein the virtual item has corresponding media content associated therewith, wherein the media content comprises first content and second content, and wherein the media content comprises one or both of audio content or video content; and
   after determining that the virtual item is present within the augmented reality space at least partially coextensive with the area comprising the location of the first playback device, play the first content corresponding to the virtual item.

2. The first playback device of claim 1, wherein the program instructions executable by the one or more processors such that the first playback device is configured to determine that the virtual item is present within the augmented reality space at least partially coextensive with the area comprising the location of the first playback device comprise program instructions executable by the one or more processors such that the first playback device is configured to:
   receive an approximate physical position corresponding to a virtual position of the virtual item within the augmented reality space; and
   determine that the virtual item is present within the augmented reality space at least partially coextensive with the area comprising the location of the first playback device when the approximate physical position corresponding to the virtual position within the augmented reality space is within the area comprising the location of the first playback device.

3. The first playback device of claim 2, wherein the program instructions executable by the one or more processors such that the first playback device is configured to determine that the virtual item is present within the augmented reality space at least partially coextensive with the area comprising the location of the first playback device when the approximate physical position corresponding to the virtual position within the augmented reality space is within the area comprising the location of the first playback device comprise program instructions executable by the one or more processors such that the first playback device is configured to:
receive an indication that the virtual position within the augmented reality space is within the area comprising the location of the first playback device.

4. The first playback device of claim 1, wherein the program instructions comprise further program instructions executable by the one or more processors such that the first playback device is configured to:
after determining that the virtual item is not present within the augmented reality space at least partially coextensive with the area comprising the location of the first playback device, play the second content corresponding to the virtual item.

5. The first playback device of claim 1, wherein the program instructions executable by the one or more processors such that the first playback device is configured to play the first content corresponding to the virtual item comprise program instructions executable by the one or more processors such that the first playback device is configured to:
mix the first content with other media content; and
play the mix of the first content and other media content.

6. The first playback device of claim 1, wherein the program instructions executable by the one or more processors such that the first playback device is configured to play the first content corresponding to the virtual item comprise program instructions executable by the one or more processors such that the first playback device is configured to:
determine at least one of a virtual orientation or a virtual position of the virtual item within the augmented reality space; and
play the first content corresponding to the virtual item based on the determined virtual orientation or virtual position of the virtual item within the augmented reality space.

7. The first playback device of claim 1, wherein the program instructions executable by the one or more processors such that the first playback device is configured to determine at least one of a virtual orientation or a virtual position of the virtual item within the augmented reality space comprise program instructions executable by the one or more processors such that the first playback device is configured to:
receive an indication of a physical orientation corresponding to the virtual orientation of the virtual item; and
receive an indication of a physical position corresponding to the virtual position of the virtual item.

8. The first playback device of claim 6, wherein the first playback device is part of a media playback system comprising the first playback device and a second playback device, and wherein the program instructions executable by the one or more processors such that the first playback device is configured to play the media content based on the determined virtual orientation or virtual position of the item relative to the playback device comprise program instructions executable by the one or more processors such that the first playback device is configured to:
send a second portion of the media content to the second playback device; and
play a first portion of the media content in synchrony with the second playback device playing the second portion of the media content.

9. The first playback device of claim 1, wherein the first playback device is part of a media playback system comprising the first playback device and a second playback device;
wherein the program instructions executable by the one or more processors such that the first playback device is configured to determine at least one of a virtual orientation or a virtual position of the virtual item within the augmented reality space comprise program instructions executable by the one or more processors such that the first playback device is configured to determine one or more of (i) at least one of a corresponding physical orientation or corresponding physical position of the virtual item relative to the first playback device and (ii) at least one of a corresponding physical orientation or corresponding physical position of the virtual item relative to the second playback device; and
wherein the program instructions comprise further program instructions executable by the one or more processors such that the first playback device is configured to:
play at least a portion of the media content at a first volume level while the second playback device plays the at least a portion of the media content at a second volume level, wherein the first volume level is based on the corresponding physical orientation or corresponding physical position of the virtual item relative to the first playback device, and wherein the second volume level is based on the corresponding physical orientation or corresponding physical position of the virtual item relative to the second playback device.

10. The first playback device of claim 1, wherein the first playback device is part of a media playback system comprising the first playback device and a second playback device;
wherein the program instructions executable by the one or more processors such that the first playback device is configured to determine at least one of a virtual orientation or a virtual position of the virtual item within the augmented reality space comprise program instructions executable by the one or more processors such that the first playback device is configured to track a corresponding physical orientation or corresponding physical position of the virtual item relative to the first playback device or the second playback device over time; and
wherein the program instructions comprise further program instructions executable by the one or more processors such that the first playback device is configured to:
play at least a portion of the media content based on the corresponding physical orientation or corresponding physical position of the virtual item relative to the first playback device.

11. The first playback device of claim 10, wherein the program instructions executable by the one or more processors such that the first playback device is configured to play at least a portion of the media content based on the corresponding physical orientation or corresponding physical position of the virtual item relative to the first playback device comprise program instructions executable by the one or more processors such that the first playback device is configured to: (i) adjust playback volume levels of the at least a portion of the media content at the first playback device and the second playback device as the corresponding physical orientation or corresponding physical position of the virtual item changes over time or (ii) change from playing a first portion of the media content to playing one or more of a combination of the first portion or second portion of the media content as the corresponding physical orientation or corresponding physical position of the virtual item changes over time.

12. Tangible, non-transitory computer-readable media comprising program instructions executable by one or more processors such that a first playback device is configured to:
   determine whether a virtual item is present within an augmented reality space at least partially coextensive with an area comprising a location of the first playback device, wherein the virtual item has corresponding media content associated therewith, wherein the media content comprises first content and second content, and wherein the media content comprises one or both of audio content or video content; and
   after determining that the virtual item is present within the augmented reality space at least partially coextensive with the area comprising the location of the first playback device, play the first content corresponding to the virtual item.

13. The tangible, non-transitory computer-readable media of claim 12, wherein the program instructions executable by the one or more processors such that the first playback device is configured to determine that the virtual item is present within the augmented reality space at least partially coextensive with the area comprising the location of the first playback device comprise program instructions executable by the one or more processors such that the first playback device is configured to:
   receive an approximate physical position corresponding to a virtual position of the virtual item within the augmented reality space; and
   determine that the virtual item is present within the augmented reality space at least partially coextensive with the area comprising the location of the playback device when the approximate physical position corresponding to the virtual position within the augmented reality space is within the area comprising the location of the first playback device.

14. The tangible, non-transitory computer-readable media of claim 13, wherein the program instructions executable by the one or more processors such that the first playback device is configured to determine that the virtual item is present within the augmented reality space at least partially coextensive with the area comprising the location of the playback device when the approximate physical position corresponding to the virtual position within the augmented reality space is within the area comprising the location of the first playback device comprise program instructions executable by the one or more processors such that the first playback device is configured to:
   receive an indication that the virtual position within the augmented reality space is within the area comprising the location of the first playback device.

15. The tangible, non-transitory computer-readable media of claim 12, wherein the program instructions comprise further program instructions executable by the one or more processors such that the first playback device is configured to:
   after determining that the virtual item is not present within the augmented reality space at least partially coextensive with the area comprising the location of the first playback device, play the second content corresponding to the virtual item.

16. The tangible, non-transitory computer-readable media of claim 12, wherein the program instructions executable by the one or more processors such that the first playback device is configured to play the first content corresponding to the virtual item comprise program instructions executable by the one or more processors such that the first playback device is configured to:
   mix the first content with other media content; and
   play the mix of the first content and other media content.

17. The tangible, non-transitory computer-readable media of claim 12, wherein the program instructions executable by the one or more processors such that the first playback device is configured to play the first content corresponding to the virtual item comprise program instructions executable by the one or more processors such that the first playback device is configured to:
   determine at least one of a virtual orientation or a virtual position of the virtual item within the augmented reality space; and
   play the first content corresponding to the virtual item based on the determined virtual orientation or virtual position of the item within the augmented reality space.

18. The tangible, non-transitory computer-readable media of claim 12, wherein the program instructions executable by the one or more processors such that the first playback device is configured to determine at least one of a virtual orientation or a virtual position of the virtual item within the augmented reality space comprise program instructions executable by the one or more processors such that the first playback device is configured to:
   receive an indication of a physical orientation corresponding to the virtual orientation of the virtual item; and
   receive an indication of a physical position corresponding to the virtual position of the virtual item.

19. The tangible, non-transitory computer-readable media of claim 12, wherein the first playback device is part of a media playback system comprising the first playback device and a second playback device;
   wherein the program instructions executable by the one or more processors such that the first playback device is configured to determine at least one of a virtual orientation or a virtual position of the virtual item within the augmented reality space comprise program instructions executable by the one or more processors such that the first playback device is configured to track a corresponding physical orientation or corresponding physical position of the virtual item relative to the first playback device or the second playback device over time; and
   wherein the program instructions comprise further program instructions executable by the one or more processors such that the first playback device is configured to:
   play at least a portion of the media content based on the corresponding physical orientation or corresponding physical position of the virtual item relative to the first playback device.

20. A method performed by a first playback device, the method comprising:
   determining whether a virtual item is present within an augmented reality space at least partially coextensive with an area comprising a location of the first playback device, wherein the virtual item has corresponding media content associated therewith, wherein the media content comprises first content and second content, and wherein the media content comprises one or both of audio content or video content; and
   after determining that the virtual item is present within the augmented reality space at least partially coextensive with the area comprising the location of the first playback device, playing the first content corresponding to the virtual item.

\* \* \* \* \*